US010578201B2

(12) United States Patent
Reiter et al.

(10) Patent No.: US 10,578,201 B2
(45) Date of Patent: Mar. 3, 2020

(54) SPROCKET WHEEL FOR A BICYCLE DRIVE

(71) Applicant: SRAM Deutschland GmbH, Schweinfurt (DE)

(72) Inventors: Markus Reiter, Schweinfurt (DE); Joachim Hanke, Niederwerrn (DE); Bryn Johnson, San Luis Obispo, CA (US); Andreas Vonend, Walgolshausen (DE); Martin Kehrer, Kirchheim (DE); Henrik Braedt, Hambach (DE); Pedro Miguel Nunes Dos Santos, Santa Clara Coimbra (PT); Luis Figueiredo, Coimbra (PT); Rodrigo Antunes, Coimbra (PT)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 0 days.

(21) Appl. No.: 15/205,180

(22) Filed: Jul. 8, 2016

(65) Prior Publication Data

US 2017/0146109 A1 May 25, 2017

(30) Foreign Application Priority Data

Jul. 3, 2015 (DE) .................. 10 2015 008 662

(51) Int. Cl.
*F16H 55/30* (2006.01)
*B62M 9/10* (2006.01)
(Continued)

(52) U.S. Cl.
CPC .............. *F16H 55/30* (2013.01); *B62M 1/36* (2013.01); *B62M 9/00* (2013.01); *B62M 9/105* (2013.01);
(Continued)

(58) Field of Classification Search
CPC ........ F16H 55/30; F16H 7/06; F16H 57/0006; F16H 55/303; B62M 9/105
(Continued)

(56) References Cited

U.S. PATENT DOCUMENTS 257,445 A * 5/1882 Lechner .................... F16H 7/06
474/152
431,529 A * 7/1890 Redlinger ................ B62M 9/08
188/27
(Continued)

FOREIGN PATENT DOCUMENTS

DE     1086957      8/1960
DE     2816137      10/1979
(Continued)

OTHER PUBLICATIONS

Japanese Industrial Standard, Bicycles—Chainwheels and Cranks, D 9415, 1993, 36 Pages.

*Primary Examiner* — Henry Y Liu

(57) ABSTRACT

An individual chain wheel for a bicycle front crank arrangement for engaging in a drive chain includes a plurality of teeth formed on a circumference of the chain wheel and having a first and a second group of teeth. The teeth of the second group of teeth are arranged in an alternating manner between the teeth of the first group of teeth. Each tooth has a load flank via which force is transmitted between an adjacent roller of the drive chain and the respective tooth. Each tooth of the first group may also have at least one profile with an opening in the vicinity of the flank, in which a portion of an inner link plate of the drive chain, which portion protrudes beyond the roller, engages.

29 Claims, 32 Drawing Sheets

(51) Int. Cl.
*B62M 1/36* (2013.01)
*B62M 9/00* (2006.01)
*F16H 55/08* (2006.01)
*F16H 57/01* (2012.01)

(52) U.S. Cl.
CPC ............ *F16H 55/08* (2013.01); *F16H 57/01* (2013.01); *F16H 2057/012* (2013.01)

(58) Field of Classification Search
USPC .................................................. 474/152, 156
See application file for complete search history.

(56) References Cited

U.S. PATENT DOCUMENTS

| | | | |
|---|---|---|---|
| 495,584 A | 4/1893 | Guthrie | |
| 513,589 A * | 1/1894 | Metz .......................... | F16H 7/06 280/236 |
| 515,449 A * | 2/1894 | Scovell ........................ | 280/236 |
| 528,145 A * | 10/1894 | Carr ............................ | F16H 7/06 474/141 |
| 530,058 A * | 11/1894 | Schaum et al. ............ | F16H 7/06 280/236 |
| 536,813 A | 4/1895 | MacPhail | |
| 556,254 A | 3/1896 | Dake | |
| 568,862 A * | 10/1896 | Miehle ...................... | B62K 3/12 280/231 |
| 586,991 A | 7/1897 | Curley | |
| 590,649 A | 9/1897 | Ribyn | |
| 591,270 A | 10/1897 | Gauthier | |
| 596,289 A * | 12/1897 | Smith .......................... | 280/236 |
| 611,170 A * | 9/1898 | Howard ................ | F16H 7/1281 474/134 |
| 613,756 A * | 11/1898 | Buddle .......................... | 474/141 |
| 619,537 A | 2/1899 | Bufford | |
| 702,841 A * | 6/1902 | Williams ...................... | 474/141 |
| 1,835,406 A | 5/1922 | Kirsten | |
| 1,482,896 A | 2/1924 | Huntington | |
| 1,638,140 A * | 8/1927 | Best ...................... | B62D 55/135 29/891.1 |
| 2,602,343 A | 12/1931 | Barrett | |
| 3,375,022 A | 3/1968 | Hattan | |
| 3,654,814 A | 4/1972 | Richmond | |
| 3,745,851 A | 7/1973 | Zeldman et al. | |
| 3,956,943 A | 5/1976 | Yamasaki | |
| 3,969,947 A * | 7/1976 | Martin ...................... | F16H 55/30 474/152 |
| 4,144,773 A * | 3/1979 | Addicks ................. | B62M 9/105 403/3 |
| 4,174,642 A * | 11/1979 | Martin ...................... | F16H 55/30 474/152 |
| 4,201,120 A | 5/1980 | Segawa | |
| 4,240,303 A | 12/1980 | Mosley | |
| 4,261,214 A | 4/1981 | Watanabe | |
| 4,501,575 A | 2/1985 | Lepeyre | |
| 4,576,587 A | 3/1986 | Nagano | |
| 4,586,914 A | 5/1986 | Nagano | |
| 4,608,878 A | 9/1986 | Shimano | |
| 4,727,636 A | 3/1988 | Nagano | |
| 4,738,653 A * | 4/1988 | Riewerts ................... | F16H 7/06 222/615 |
| 4,867,733 A | 9/1989 | Yamanoi et al. | |
| 5,022,280 A * | 6/1991 | Boiko ................. | F16H 55/0826 74/462 |
| 5,192,250 A * | 3/1993 | Kobayashi ............... | B62M 9/10 474/160 |
| 5,215,701 A | 6/1993 | Gould et al. | |
| 5,759,124 A * | 6/1998 | Sung ........................ | B62M 9/10 474/152 |
| 5,830,096 A * | 11/1998 | Schmidt ................... | B62M 9/10 474/156 |
| 5,876,159 A * | 3/1999 | Tseng ...................... | B23F 19/10 409/131 |
| 5,921,877 A * | 7/1999 | Suzuki ...................... | F16H 7/06 474/156 |
| 5,935,033 A | 8/1999 | Tseng | |
| 5,976,045 A * | 11/1999 | Young ........................ | F16H 7/06 474/152 |
| 5,993,344 A * | 11/1999 | Young ...................... | F16G 13/06 474/156 |
| 6,013,001 A | 1/2000 | Miyoshi | |
| 6,045,472 A * | 4/2000 | Sung ........................ | B62M 9/10 474/158 |
| 6,139,456 A * | 10/2000 | Lii ............................ | B62M 9/10 474/152 |
| 6,179,741 B1 * | 1/2001 | Young ...................... | F16H 7/06 474/156 |
| 6,190,275 B1 | 2/2001 | Ciancio et al. | |
| 6,203,462 B1 | 3/2001 | Takamori | |
| 6,325,734 B1 * | 12/2001 | Young ...................... | F16H 7/06 474/156 |
| 6,340,338 B1 * | 1/2002 | Kamada ................. | B62M 9/10 474/152 |
| 6,371,875 B2 * | 4/2002 | Young ...................... | F16H 7/06 474/156 |
| 6,415,532 B1 * | 7/2002 | Bricko .................... | E02F 3/143 37/352 |
| 6,500,084 B2 | 12/2002 | Wigsten | |
| 6,666,786 B2 * | 12/2003 | Yahata ................... | B62M 9/105 474/152 |
| 6,736,744 B1 * | 5/2004 | Wigsten .................. | F16H 55/30 474/152 |
| 6,761,657 B2 * | 7/2004 | Young ...................... | F16H 7/06 474/152 |
| 7,074,147 B2 * | 7/2006 | Young ...................... | F16H 7/06 474/156 |
| 7,371,200 B2 * | 5/2008 | Young ...................... | F16H 7/06 156/160 |
| 7,416,500 B2 * | 8/2008 | Young ...................... | F16H 7/06 474/152 |
| 7,686,721 B2 * | 3/2010 | Tabe ...................... | B62M 9/105 474/116 |
| 7,740,555 B2 * | 6/2010 | Markley .................. | F16H 7/06 474/156 |
| 7,824,287 B2 * | 11/2010 | Nonoshita .............. | B62M 9/105 474/152 |
| 7,883,437 B2 * | 2/2011 | Braedt .................... | F16H 55/30 474/141 |
| 8,083,624 B2 * | 12/2011 | Young ...................... | F16H 7/06 474/100 |
| 8,092,329 B2 * | 1/2012 | Wickliffe ............... | B62M 9/105 474/160 |
| 8,882,619 B2 * | 11/2014 | Braedt .................... | F16H 7/06 474/156 |
| 9,062,758 B2 * | 6/2015 | Reiter .................... | F16H 55/303 |
| 9,086,138 B1 * | 7/2015 | Emura ................... | B62M 9/105 |
| 9,150,277 B2 * | 10/2015 | Emura .................... | B62M 3/00 |
| 9,182,027 B2 * | 11/2015 | Reiter ................... | B62M 9/105 |
| 9,291,250 B2 * | 3/2016 | Reiter .................... | B62M 9/105 |
| 9,328,814 B2 | 5/2016 | Wesling | |
| 9,394,986 B2 | 7/2016 | Pfeiffer | |
| 9,394,987 B2 * | 7/2016 | Pfeiffer ................. | B62M 9/105 |
| 9,404,565 B2 * | 8/2016 | Pfeiffer ................. | B62M 9/10 |
| D774,987 S | 12/2016 | Miles | |
| 9,540,070 B2 | 1/2017 | Watarai et al. | |
| 9,581,229 B2 * | 2/2017 | Pfeiffer .................. | F16H 55/30 |
| 9,581,230 B2 * | 2/2017 | Pfeiffer .................. | F16H 7/06 |
| 9,581,231 B2 * | 2/2017 | Pfeiffer .................. | F16H 55/30 |
| 9,625,027 B2 * | 4/2017 | Pfeiffer .................. | F16H 55/30 |
| 9,669,899 B2 * | 6/2017 | Barefoot ................. | B62M 9/00 |
| 2004/0116224 A1 | 6/2004 | Sakamoto | |
| 2004/0185977 A1 * | 9/2004 | Young ...................... | F16H 7/06 474/202 |
| 2004/0209721 A1 * | 10/2004 | Chattin .................... | B62M 9/10 474/160 |
| 2005/0014590 A1 * | 1/2005 | Wen ........................ | B62M 9/00 474/152 |
| 2005/0079940 A1 * | 4/2005 | Reiter .................... | B62M 9/10 474/160 |

(56) References Cited

U.S. PATENT DOCUMENTS

| | | | |
|---|---|---|---|
| 2005/0282672 A1* | 12/2005 | Nonoshita | B62M 9/105 474/161 |
| 2006/0172840 A1* | 8/2006 | Kamada | B62M 9/10 474/152 |
| 2006/0205549 A1* | 9/2006 | Nonoshita | B62M 9/105 474/160 |
| 2006/0258498 A1 | 11/2006 | Tabe | |
| 2007/0049437 A1* | 3/2007 | Wickliffe | B62M 9/10 474/152 |
| 2007/0054768 A1* | 3/2007 | Miyazawa | F16H 55/30 474/152 |
| 2007/0060428 A1* | 3/2007 | Meggiolan | B62M 9/10 474/160 |
| 2007/0265122 A1* | 11/2007 | Emura | B62M 9/105 474/152 |
| 2008/0132367 A1* | 6/2008 | Braedt | B62M 9/10 474/161 |
| 2011/0092327 A1 | 4/2011 | Oishi | |
| 2013/0072334 A1* | 3/2013 | Braedt | B62M 9/10 474/156 |
| 2013/0109519 A1 | 5/2013 | Morita | |
| 2013/0139642 A1* | 6/2013 | Reiter | B62M 9/105 74/594.2 |
| 2013/0184110 A1* | 7/2013 | Reiter | F16H 55/303 474/152 |
| 2014/0100069 A1 | 4/2014 | Reiter | |
| 2014/0221139 A1* | 8/2014 | Choi | B62M 9/08 474/141 |
| 2015/0094179 A1 | 4/2015 | Iwai et al. | |
| 2015/0239528 A1 | 8/2015 | Barefoot | |
| 2015/0285362 A1 | 10/2015 | Pfeiffer | |
| 2015/0285363 A1 | 10/2015 | Pfeiffer | |
| 2015/0285364 A1 | 10/2015 | Pfeiffer | |
| 2015/0362057 A1 | 12/2015 | Wesling et al. | |
| 2016/0238122 A1 | 8/2016 | Medaglia et al. | |
| 2016/0298752 A1 | 10/2016 | Winans | |

FOREIGN PATENT DOCUMENTS

| | | |
|---|---|---|
| DE | 102015000912 | 7/2015 |
| EP | 0034445 | 8/1981 |
| EP | 1489338 | 5/2006 |
| GB | 825336 | 12/1959 |
| JP | S56042489 | 9/1979 |
| JP | S5890 | 5/1981 |
| JP | S60104866 | 5/1985 |
| JP | S628181 | 1/1987 |
| JP | H01171795 | 12/1989 |
| JP | H02164684 | 6/1990 |
| JP | H02103890 | 8/1990 |
| JP | H0740387 | 7/1995 |
| JP | 2000355295 | 12/2000 |
| JP | 2001187957 | 7/2001 |
| JP | 2002243020 | 8/2002 |
| JP | 2007071302 | 3/2007 |
| JP | 2007198403 | 8/2007 |
| TW | I316490 | 11/2009 |
| TW | I338655 | 2/2011 |
| WO | 9307044 | 4/1993 |
| WO | 03095867 | 11/2003 |

* cited by examiner

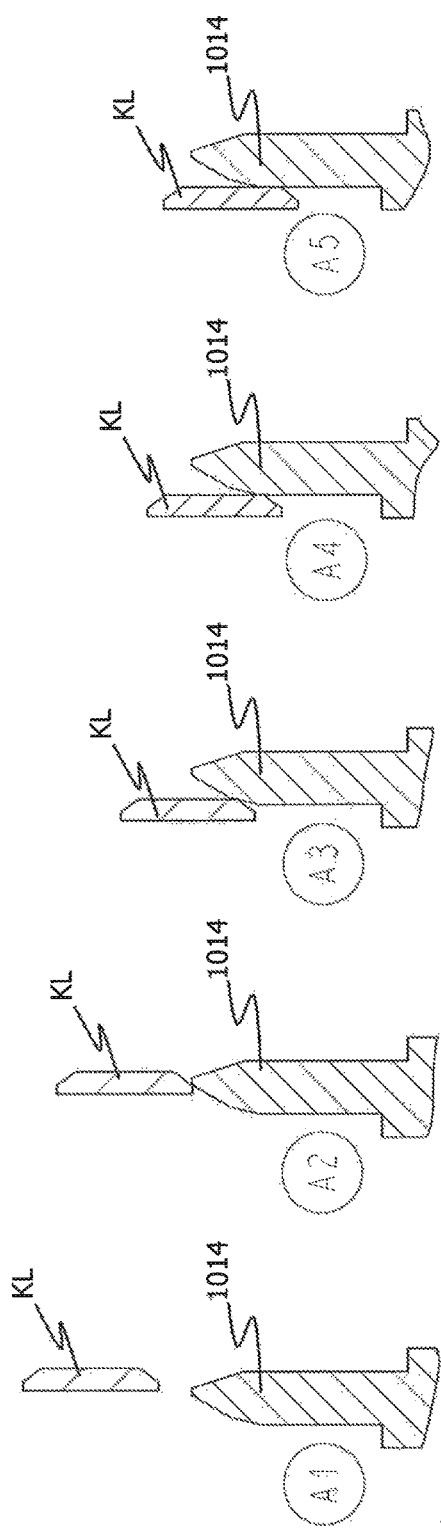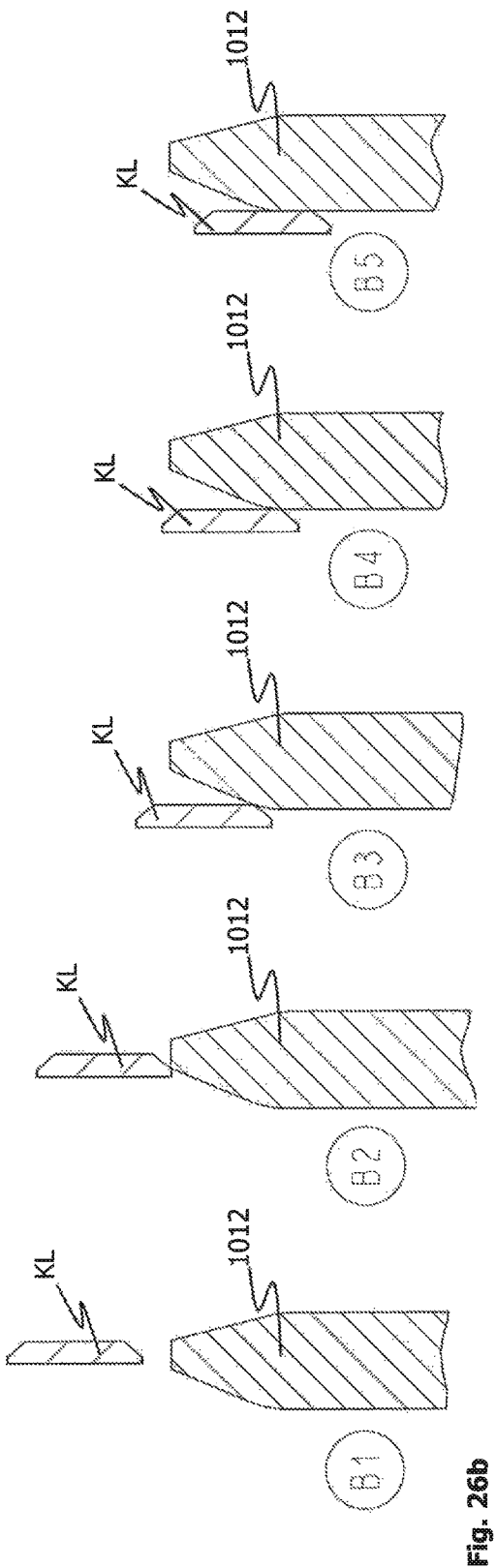
Fig. 26a
Fig. 26b

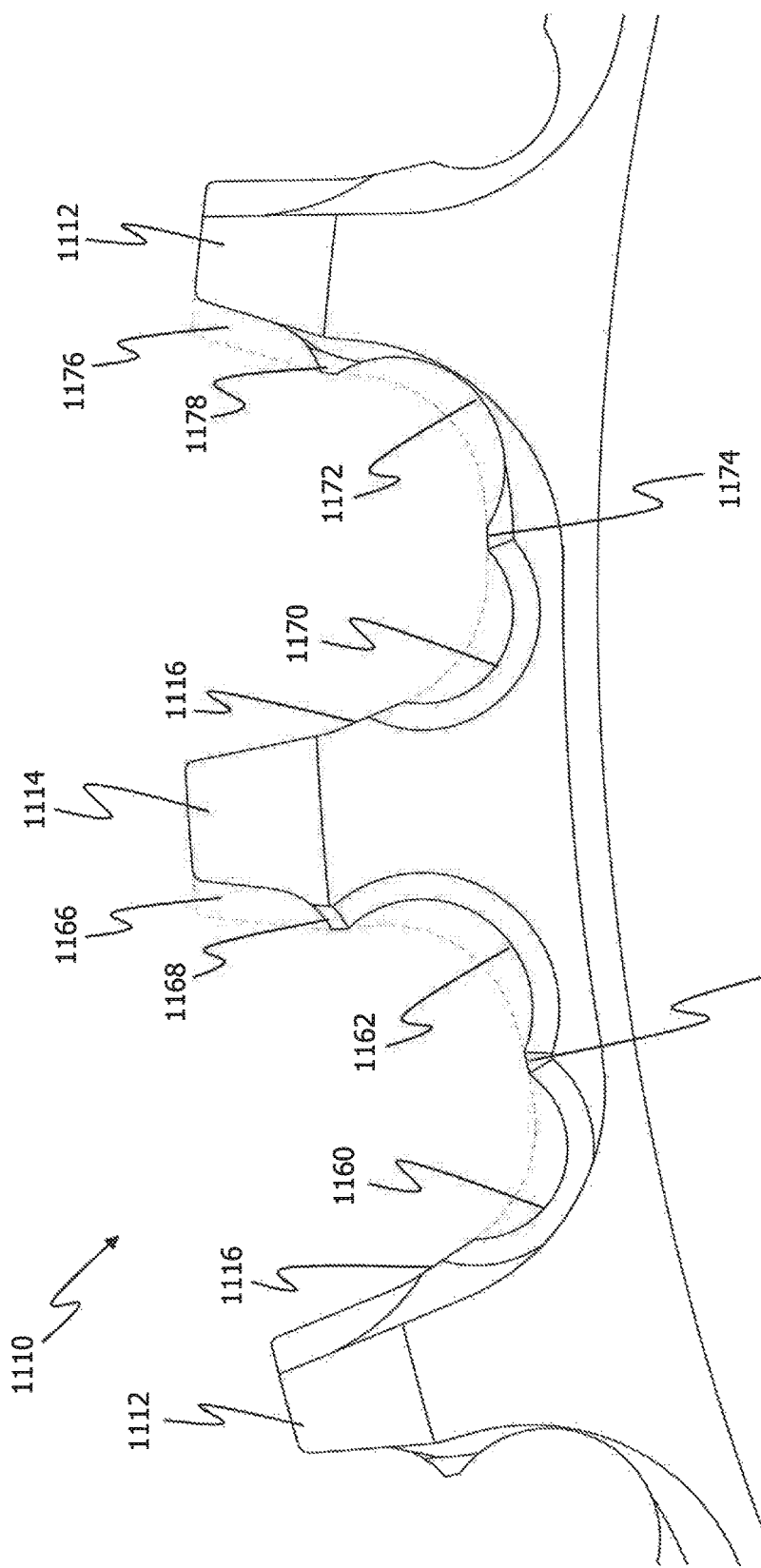

SPROCKET WHEEL FOR A BICYCLE DRIVE

This application claims priority to, and/or the benefit of, German patent application DE 10 2015 008 662.6, filed on Jul. 3, 2015.

FIELD OF THE INVENTION

The invention relates to an individual chain wheel for a bicycle front crank arrangement for engaging a drive chain.

BACKGROUND

In the case of bicycles having a chain driven drive train and having an individual chain wheel on the front crank arrangement, the chain is driven via said individual chain wheel. For this purpose, during driving, the individual chain wheel engages in sections by means of the teeth thereof in the chain and interacts in a known manner therewith. The advantage of a bicycle front crank arrangement with an individual chain wheel in comparison to a front crank arrangement with a plurality of chain wheels consists in that fewer components are installed. For example, in such an arrangement, it is possible to dispense with further chain wheels on the front crank arrangement and with a derailleur. Fewer components and an associated reduction in the number of gear changing operations lead at the same time to such an arrangement being less prone to gear changing errors.

However, arrangements of this type also dispense with securing components which secure the drive chain on the individual chain wheel and inhibit the chain from jumping under load radially outward over the teeth which are in engagement. For this reason, it is attempted, in the case of individual chain wheels, to form the teeth in such a manner that the geometry of the teeth prevents the chain from jumping off or over. For this purpose, the teeth of individual chain wheels generally have load flanks which are as steep as possible.

An individual chain wheel for a bicycle front crank arrangement is known, for example, from German laid open application DE 10 2012 023 819 A1. The document describes an individual chain wheel for engaging in a drive chain, the individual chain wheel comprising a plurality of teeth. The plurality of teeth includes a first group of teeth and a second group of teeth which is arranged in an alternating manner between the first group of teeth. The two groups of teeth are formed here with differing material thickness with respect to the corresponding chain gaps of the drive chain in order to permit secure engagement of the teeth of the individual chain wheel in the drive chain. As already described previously, this arrangement also has teeth with relatively steep load flanks in order to inhibit the chain from jumping under load outward over the teeth.

Teeth formed in such a manner and having steep load flanks may have a wear induced abrasion of material caused in the load flanks in a region of the greatest loading by the rollers of the drive chain over the service life of the chain wheel. In other words, the roller digs further into the respective load flanks over the duration of the loading. As a result thereof, edges are produced in the load flanks of the teeth, which edges may impede and/or block the slipping of the drive chain or of the rollers. In this case, reference is made to "chain suck" occurring.

FIG. 35 shows by way of example with dashed lines various states of the continuous abrasion of material on the load flanks of the teeth of known individual chain wheels, starting from an initial state shown by a solid line. The production of an edge over the duration of the loading is visible here, the edge, as described previously, constituting an obstacle for the respective roller and therefore impeding the slipping of the drive chain.

This negative effect occurs in particular in the case of bicycle front crank arrangements with individual chain wheels. The latter are loaded comparatively more strongly than the respective chain wheels of a front crank arrangement with a multiple chain wheel arrangement since the chain interacts continuously with one and the same chain wheel of the front crank arrangement during operation.

It is therefore an object of this disclosure to provide an individual chain wheel for a bicycle front crank arrangement, in which abrasion of material in the load flanks of the teeth by the rollers, which act thereon, of the drive chain does not lead to blocking of the drive chain, and therefore a substantially unimpeded slipping of the drive chain is still possible under wear even after operation for a relatively long time. An additional object may involve the prevention of the rollers which are in engagement from jumping under loading radially outward with respect to a central axis of the chain wheel over the teeth which are in engagement.

SUMMARY AND DESCRIPTION

In an embodiment, an individual chain wheel for a bicycle front crank arrangement for engaging in a drive chain includes a plurality of teeth formed on a circumference of the chain wheel and having a first and a second group of teeth, wherein the teeth of the second group of teeth are arranged in an alternating manner between the teeth of the first group of teeth. Teeth of the chain wheel each have a load flank via which force is transmitted between an adjacent roller of the drive chain and a respective tooth of the plurality of teeth. Each tooth of the first group has at least one profile with an opening in a vicinity of the flank, in which a portion of an inner link plate of the drive chain, which portion protrudes beyond the roller, engages. The load flank and the at least one profile of at least one tooth of the first group of teeth are geometrically designed and arranged with respect to each other in such a manner that, even in the event of wear involving stressing of the load flank as a consequence of transmission of force via the rollers during operation of the individual chain wheel, an unobstructed disengagement of the respective roller adjacent to the load flank and of the tooth is ensured.

In an embodiment, a front crank arrangement for a bicycle includes a crank arm, and an individual chain wheel attached to the crank arm, wherein the individual chain wheel is configured for engaging in a drive chain of the bicycle. The individual chain wheel includes a plurality of teeth formed on a circumference of the chain wheel and having a first and a second group of teeth, wherein the teeth of the second group of teeth are arranged in an alternating manner between the teeth of the first group of teeth. Each tooth has a load flank via which force is transmitted between an adjacent roller of the drive chain and a respective tooth of the plurality of teeth. Each tooth of the first group has at least one profile with an opening in a vicinity of the flank, in which a portion of an inner link plate of the drive chain, which portion protrudes beyond the roller, engages. The load flank and profile of at least one tooth of the first group of teeth are geometrically designed and arranged with respect to each other in such a manner that, even in the event of wear involving stressing of the load flank as a consequence of transmission of force via the rollers during operation of the individual chain wheel, an unobstructed disengagement of the respective roller adjacent to the load flank and of the tooth is ensured.

BRIEF DESCRIPTION OF THE DRAWINGS

FIGS. 26a and 26b show illustrations of different operating phases for the engagement of the teeth of the individual chain wheel according to FIG. 20 and an approaching link plate, FIG. 29 shows an illustration of a detail of a chain wheel according to a further embodiment.

DETAILED DESCRIPTION OF THE DRAWINGS

Figure 1:
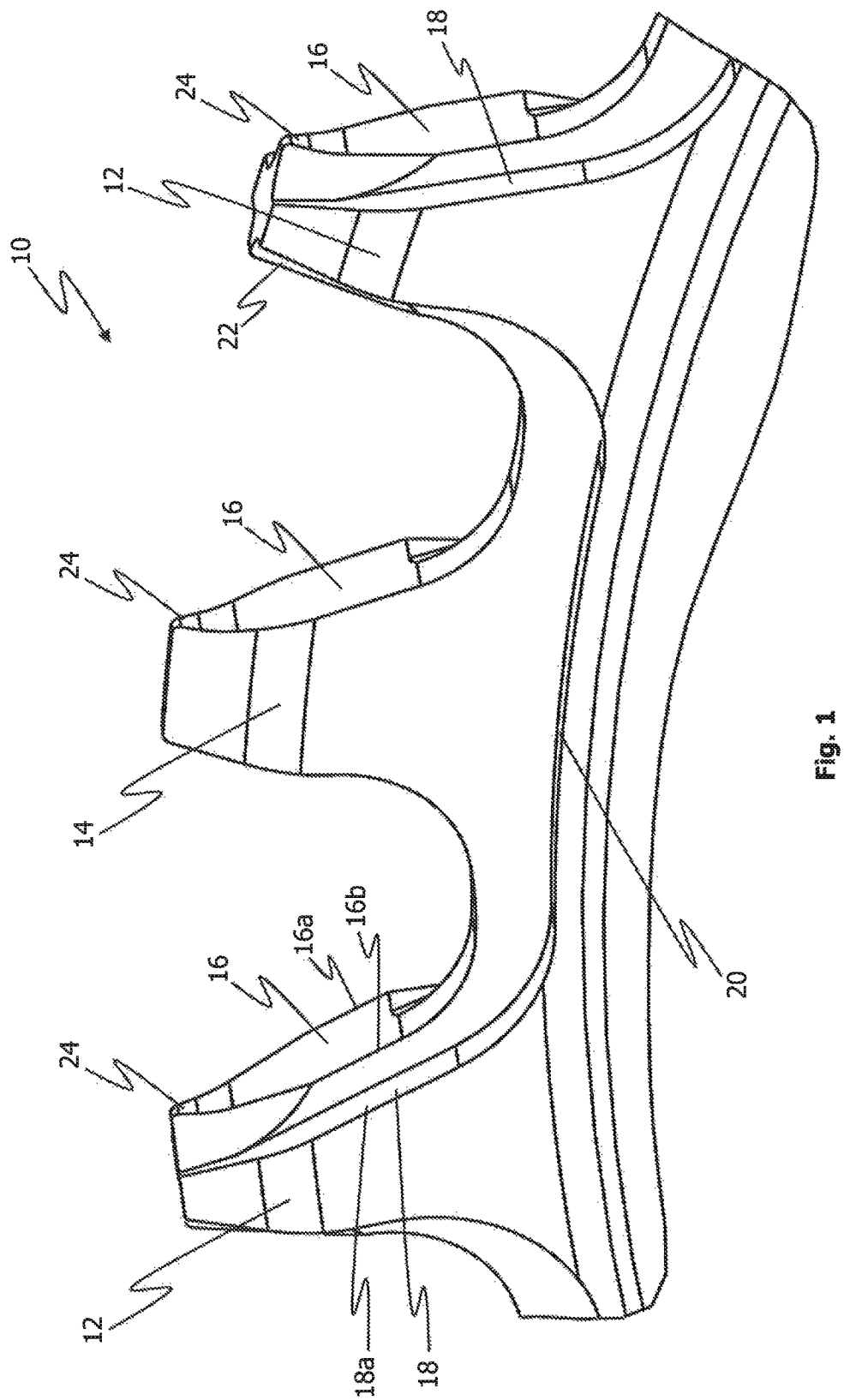
FIG. 1 shows a perspective view of a detail of an individual chain wheel according to a first embodiment.

An individual chain wheel has a plurality of teeth formed on a circumference of the chain wheel and having a first and a second group of teeth. The teeth of the second group of teeth are arranged here in an alternating manner between the teeth of the first group of teeth, wherein each tooth has a load flank via which force is transmitted between an adjacent roller of the drive chain and the respective tooth. Each tooth of the first group has at least one profile with an opening in the vicinity of the flank, in which a portion of an inner link plate of the drive chain, which portion protrudes beyond the roller, engages.

In an embodiment, the load flank and the profile of at least one tooth, of a plurality of teeth, or of all of the teeth, of the first group of teeth of the individual chain wheel are geometrically designed and arranged with respect to one another in such a manner that, even in the event of wear involving stressing of the load flank as a consequence of the transmission of force via the rollers during operation of the individual chain wheel, an unobstructed disengagement of the respective roller adjacent to the load flank and of the tooth is ensured. It goes without saying that, during the operation, only a certain portion of the plurality of teeth is ever in engagement with the drive chain, wherein, during a complete revolution of the individual chain wheel, each tooth enters at least briefly into interaction with a roller of the drive chain.

During the interaction of an individual chain wheel and a drive chain, a differentiation can be made between various phases. Said phases or the processes proceeding during operation are described below in kinematic reversal for better understanding, i.e. in consideration of a stationary individual chain wheel and a load strand which is placed tangentially onto the individual chain wheel, and an empty strand which is raised tangentially from the individual chain wheel.

The load strand pivots about a final chain stud in a chain joint, the roller of which engages at maximum in one tooth gap of the individual chain wheel, with there being kinking of the drive chain at said chain joint. The load strand here is pivotable about said chain joint until an adjacent chain joint in the load strand engages by means of the roller thereof at maximum in one tooth gap of the individual chain wheel. From this point, the load strand pivots about the adjacent chain joint, whereupon the processes described are repeated in respect of the next adjacent chain joint to be brought into engagement. During these processes, initially the drive chain extending away tangentially from the individual chain wheel approaches the teeth of the individual chain wheel or the teeth approach the drive chain. Subsequently, a tooth crest of one of the teeth of the individual chain wheel enters a gap between a pair of link plates of the drive chain, as a result of which the individual chain wheel enters into engagement with the drive chain. During the engagement, at the beginning axial tooth surfaces of the entering tooth enter into contact with an inner surface of a link plate of the corresponding gap of the drive chain. That link plate of the drive chain which is in contact slides down a slope of the axial tooth surface, as a result of which the link plate, and therefore the associated chain link, executes an axial offset movement relative to the tooth, which is under consideration, of the individual chain wheel. At the same time, the link plate also shifts here radially in the direction of the individual chain wheel. The tooth subsequently shifts in a radial movement further in the radial direction into the gap of the drive chain until the roller engages at maximum in the tooth gap. No further axial movement of the link plate in relation to the tooth of the individual chain wheel is executed here. In the state of maximum engagement, on the lower side of the roller, as viewed in the direction of the axis of rotation of the individual chain wheel, there is merely still a minimum distance between the roller and the chain wheel, which is referred to as "ground clearance". The amount of said distance can be, for example, in the region of 0.2 to 0.3 mm. It goes without saying that the previously described steps are repeated in the described manner during engagement of the next chain joint. Time overlaps occur here depending on the number of teeth and size of the chain wheel.

In the case of chain wheels of this type, it depends on whether each tooth newly engaging in a link plate gap of the chain does not come on the tooth tip for riding thereon but rather a safety distance between the tooth crest and the link plates continues always to exist. This achieves the aim that no additional chain-guiding devices are required, even if the chain, for example because of a current gear-changing position on a rear set of sprockets or a sprocket cassette, enters the chain wheel in an oblique position at a relatively large angle. The clearance for moving the chain links in the axial direction is defined by the direction in which the chain links which are fully in engagement on the teeth are oriented. The deviation from this orientation is limited by the "flexibility" of the chain in the axial direction, which, however, does not constitute an actual bending, but rather merely the use of play in the axial direction between the chain links.

When the individual chain wheel and the drive chain are disengaged, the previously described steps can be substantially observed in a reverse sequence and reverse direction of the direction of rotation, beginning with a maximum engagement and ending with an increasing spacing-apart of the chain joint and the individual chain wheel. An essential aspect here is also a reversal of the direction of rotation of the chain wheel, which is of importance, for example, if the bicycle is ridden on rough terrain, wherein the foot pedals have to be brought into a horizontal position to support the cyclist. The cyclist then, for example, subjects the two pedals which are in the horizontal position to his entire body weight. The corresponding pedal orientation can be undertaken in certain situations by reverse pedaling. The chain must not jump off in such situations either. During the reverse pedaling, the chain outlet point of the forward pedaling becomes the chain inlet point during reverse pedaling. Even during such a use, the embodiments described herein ensure a stable position of the chain without obstructing the release of said chain from the individual chain wheel even under wear.

In an embodiment, the individual chain wheel may have an asymmetric design of the opening in the vicinity of the flank. In this case, the opening in the profile can be set back in a more pronounced manner in relation to the load flank of the tooth, which is under consideration, of the first group of teeth, as viewed in the circumferential direction, than in relation to a counterload flank on the rear side of a closest tooth, as viewed in the circumferential direction, of the first group of teeth. This asymmetric design of the opening makes it possible for a roller acting on the load flank to dig further into the load flank during operation than known individual chain wheels without those portions of inner link plates of the drive chain that protrude beyond the roller entering into contact with the tooth.

In a further embodiment, but also independently of the features described above, the load flank of the at least one tooth of the first group of teeth, or of a plurality of teeth or of all of the teeth, can have, at least in sections, a load flank angle within a region of between 110° and 125°. In an embodiment the load flank of the at least one tooth of the first group of teeth, or of a plurality of teeth or of all of the teeth, can have, at least in sections, a load flank angle within a region of 115°. Such load flank angles are comparatively shallow in relation to load flank angles of known individual chain wheels and therefore brings about a distribution of the driving forces to a plurality of teeth of the individual chain wheel. The load flank angle is spanned by the load flank under consideration and by a tangent of an auxiliary circle. The auxiliary circle is coaxial with respect to the circumferential circle of the individual chain wheel and intersects the load flank at an end of the load flank that is located radially on the inside with respect to the axis of rotation of the individual chain wheel, i.e. at the geometric location at which that portion of the load flank which is located radially furthest on the inside and runs rectilinearly merges into a tooth gap of rounded design. The tangent of the auxiliary circle touches the auxiliary circle at said intersecting point of auxiliary circle and load flank. The load flank angle corresponds finally to the angle between the load flank and the tangent, which angle is greater than 90°.

By means of the distribution of the driving forces to a plurality of teeth, a comparatively shallow load flank angle leads to lower contact forces between individual teeth and rollers, which are in engagement therewith, of the drive chain. This in turn brings about a reduction of the wear of the at least one tooth, which is why the rollers of the drive chain can dig less strongly into the shallow load flank over the duration of the operation. As a result, an unimpeded disengagement of the respective roller adjacent to the load flank and of the tooth can be further improved.

In an embodiment, but also independently of the above-discussed features of the individual chain wheel, teeth of the individual chain wheel can be of flatter design in high load zones than in slack point zones, wherein high load zones correspond to the zones of the individual chain wheel at which, during operation, the greatest transmission of force between teeth of the individual chain wheel and rollers of the drive chain occurs, and wherein slack point zones correspond to the zones of the individual chain wheel at which, during operation, the smallest transmission of force between teeth of the individual chain wheel and rollers of the drive chain occurs. High load zones and slack point zones can be determined depending on a crank position of a crank arm of the individual chain wheel, wherein the greatest transmission of force occurs in the high load zones at a substantially horizontal crank position. While the shallow load flank angles, i.e. the load flank angles within the region of between 110° and 125°, for example within the region of 115°, on teeth in the high load zones bring about a reduction in wear, the steeper or regular load flank angles on teeth in the slack point zones can be designed in such a manner that the drive chain is prevented from jumping over or jumping off. If the individual chain wheel is mounted onto a foot pedal arrangement, a tooth region having teeth with more shallow load flank angles can be positioned in such a manner that, during operation, the chain runs off from said tooth region approximately tangentially whenever specifically a large pedaling force is being exerted on the foot pedal arrangement by the cyclist, for example whenever the foot pedal is at an angle of 20°.

Furthermore, the slack point zones can lie in a plane with the crank arm. Alternatively, the slack point zones, as viewed in the circumferential direction of the individual chain wheel, can lie in a plane different by +/45° from the crank arm plane.

Furthermore, slack point zones can be located substantially at right angles to one another about high load zones, as viewed in the circumferential direction of the individual chain wheel, wherein a different angular position with respect to one another is also possible.

Teeth opposite one another on the circumference of the chain wheel, i.e. teeth displaced with respect to one another by 180°, can furthermore each have the same load flank angle.

In a development, the change of the load flank angles of teeth having regular load flank angles in the slack point zones to teeth having shallow load flank angles in the high load zones can proceed continuously along the circumference of the individual chain wheel, i.e. said load flank angles can increase or decrease substantially continuously. Alternatively, it is also possible merely for individual teeth or a plurality of teeth to have steep load flanks in the slack point zones or shallow load flanks in the high load zones.

In a development, at least one projection, which engages, at least in sections in the circumferential direction, over the adjacent roller or the inner link plate, can be formed at least on every second tooth, or on every tooth of the first group of teeth. Such an engagement, at least in sections, over an adjacent roller or inner link plate can oppose the drive chain jumping over or jumping off, despite a shallow load flank angle.

Furthermore, the at least one projection can be provided on a region of the tooth under consideration, which region lies radially on the outside with respect to a central axis of the individual chain wheel. Furthermore, the at least one projection can connect the load flank and a radially outwardly facing upper side of the tooth under consideration. According to a development, the at least one projection can be designed here in the form of a hook projecting in the circumferential direction from the load flank in order to secure the adjacent roller and therefore the drive chain against jumping over or jumping off.

In a further embodiment, the at least one projection can have, as viewed transversely with respect to the circumferential direction of the individual chain wheel, a smaller width than the load flank or be formed with a decreasing material thickness, as viewed in the circumferential direction. For this purpose, a corresponding, and/or lateral or bilateral, beveling can be provided on a region of the tooth under consideration, which region lies radially on the outside with respect to a central axis of the individual chain wheel and at which the tooth begins to engage in the gap between link plates of the drive chain.

According to a further embodiment, the at least one projection can be provided in the at least one opening in the vicinity of the flank and can therefore engage, at least in sections, over an adjacent inner link plate of the drive chain. In this connection, the at least one projection can furthermore be provided at one end of the at least one opening in the vicinity of the flank and by means of a radially outer edge can be adjacent to a region of the load flank. Although the at least one projection can therefore enter into contact with a portion of the inner link plate of the drive chain, in order to secure the chain against jumping over or jumping off, the projection, because of the geometrical configuration and arrangement thereof, does not prevent disengagement of the tooth under consideration and of the drive chain adjacent thereto.

In an embodiment, the at least one load flank has a recess. Said recess is set back in relation to the load flank and is arranged on the tooth under consideration in such a manner that, despite wear occurring during operation, i.e. despite the roller digging into the load flank, no edge opposing a designated disengagement of the tooth under consideration and of the roller adjacent thereto is formed in the load flank. In other words, even the formation of a wearing edge can be opposed by means of the recess. The recess may be arranged radially outside and away from a contact point of a roller with the load flank during operation. Said recess is intended not to impair the contact of the roller with the load flank, but rather to become effective only if wear occurs.

The recess can furthermore have a curved contour and/or can extend over the entire width of the at least one load flank. As a result, the adjacent roller can slip in a substantially unimpeded manner despite wear occurring.

According to a further embodiment, the at least one load flank can also have a first recess-free load flank portion which is adjacent to the at least one recess radially inward with respect to the central axis of the chain wheel. The recess can furthermore connect the first recess-free load flank portion and a radially outer crest region of the respective tooth. The recess here, by means of an end region, which is located radially on the inside with respect to the central axis of the chain wheel, can be adjacent to the recess-free load flank portion and by means of an end region, which is located radially on the outside with respect to the central axis of the chain wheel, can be adjacent to the crest region. However, the recess may also extend as far as the tooth tip or as far as the tooth crest.

As an alternative thereto, the at least one load flank can have a second recess-free load flank portion which is adjacent to the recess radially outward with respect to the central axis of the chain wheel. In this case, the at least one recess is arranged between the two recess-free load flank portions.

In the various embodiments, the first and/or the second recess-free load flank portion can have a shallow load flank angle, i.e. a load flank angle within a region of 110° and 125°, for example within a region of 115°.

In an embodiment, each tooth may have a further load flank which is arranged opposite the at least one load flank and is spaced apart therefrom, wherein the second load flank is formed substantially symmetrically with respect to the at least one load flank. This has the advantage that production costs can be reduced because of the symmetrical design.

In addition, it is thereby possible to provide an individual chain wheel which has a load flank and a counterload flank. An individual chain wheel of this type can be repositioned in a mirror-inverted manner on the bicycle by a side of the individual chain wheel previously facing the bicycle frame being repositioned so as to face away from the bicycle frame, and therefore the individual chain wheel is useable from both sides. By this means, the individual chain wheel can have twice as long a service life as conventional individual chain wheels having only one useable running direction.

The further load flank or counterload flank can have the same features as described previously and below.

In an embodiment, in the region of the profile, the opening in the vicinity of the flank can be set back merely in sections in relation to the load flank by a greater distance than the distance over which a portion of an inner link plate of the drive chain of the roller, which portion runs ahead during operation, protrudes over the roller. For example, the opening in the vicinity of the flank can be set back by a third further in sections in relation to the load flank than the rest of the opening. By this means, it can be ensured that the portion of the inner link plate of the drive chain, which portion runs ahead during operation and protrudes over the roller, does not enter into contact with the opening even if the roller digs into the load flank during operation. It is thus possible to prevent contact between the inner link plate of the drive chain and the tooth in the region of the opening from opposing a designated disengagement.

In this development, the opening in the vicinity of the flank can furthermore have, in the region of the tooth crest, a projection pointing toward the load flank.

According to a further embodiment, the tooth tips of the teeth of the first group of teeth can have a smaller material thickness, as viewed in a direction transversely with respect to the circumferential direction, than the tooth tips of known teeth of the first group of teeth. By this means, the lateral guiding properties, i.e. as viewed in a direction transversely with respect to the circumferential direction, of the individual chain wheel can be improved. A reduction in the material thickness of the tooth tips of the teeth of the first group of teeth permits a greater lateral deflection of the drive chain without the latter thereby sitting on tooth tips of teeth of the first group of teeth during operation. The material thickness of the tooth tips of the teeth of the first group of teeth can be reduced in relation to known teeth of the first group of teeth in that shortened lateral guide surfaces on the individual teeth of the first group of teeth are provided with steeper guide surface angles, the lateral guide surfaces are reduced with the guide surface angle remaining the same, or the tooth tips are extended radially outward with the guide surface angle remaining the same.

In this embodiment, the teeth of the second group of teeth can be formed with a lower height, as viewed in the radial direction of the individual chain wheel, than the teeth of the first group of teeth. The teeth of the second group of teeth can have here a height of at maximum 90% of the height of the teeth of the first group of teeth. In an embodiment, the teeth of the second group of teeth can have a height of at maximum 75% of the height of the teeth of the first group of teeth. In an embodiment the teeth of the second group of teeth can have a height of at maximum 50% or less, of the height of the teeth of the first group of teeth. The effect can thereby be achieved that the drive chain which is guided in each case by adjacent teeth of the first group of teeth, which teeth run ahead in the circumferential direction, has already been moved sufficiently far in the axial direction by said teeth that the teeth of the second group of teeth can engage in the provided gaps of the drive chain in a substantially unobstructed and secure manner.

Smaller forces occur during operation in the region of the counterload flank than in the region of the load flank, which is why, particularly in this region, soiling may prevent contact between the individual chain wheel and rollers, which may lead to the drive chain jumping off during operation.

In a further embodiment, between teeth of the first group of teeth and teeth of the second group of teeth in the region of a counterload flank or on a rear side of a tooth of the second group of teeth, which rear side is opposite the load flank, or in a tooth gap adjacent to the load flank, the individual chain wheel can therefore have an outer contouring leading to local contact points or contact portions with a roller. Said local contact points or contact portions can penetrate dirt particles, for example mud, on the individual chain wheel and can therefore move the adjacent roller to a position on the load flank that is optimum for the engagement and transmission of load.

The outer contouring can be provided here by adding at least one recess in the shape of an arc of a circle, wherein the radius of the arc of the circle is smaller than the radius of the roller.

In an embodiment, at least one tooth of the first group of teeth and/or at least one tooth of the second group of teeth of the individual chain wheel can have at least one wear indicator in the form of a depression. Wear and, associated therewith, a remaining service life of the individual chain wheel can be indicated with the aid of said wear indicator. It is also possible in principle for the features discussed with respect to the wear indicator to be used irrespective of teeth of differing material thickness in conventional chain wheels.

The at least one wear indicator can be arranged in a region of the tooth of the first group of teeth and/or of the tooth of the second group of teeth, which region enters into contact with the chain during operation. Furthermore, the at least one wear indicator can be provided on the tooth or the teeth which is or are subjected to the greatest stress or worn down the most during operation.

The at least one wear indicator can be formed here in the region of the load flank of the respective tooth in order to indicate the wear occurring due to interaction of the tooth with the rollers of the chain. In this connection, the wear indicator in the region of the load flank can be designed in the form of a depression which is in the shape of an arc of a circle and is set back in relation to the load flank, as viewed in the circumferential direction. In addition, the wear indicator can be arranged adjacent to the tooth root or tooth base. The recess can extend along the entire material thickness of the tooth, i.e. over the entire tooth depth, or only over a portion thereof, for example in a partial region of 30% to 50% of the tooth depth.

Alternatively or additionally thereto, the at least one wear indicator can be formed in the region of one or both side surfaces of the respective tooth in order to indicate the wear occurring by means of interaction of the tooth with the link plates of the chain. In this case, the wear indicator can be provided, as viewed transversely with respect to the circumferential direction, in the form of a circular depression with a constant depth.

Over the course of the operation, those regions of the respective tooth which are adjacent to the wear indicator are progressively abraded by engagement with the drive chain or are progressively eroded in the direction of maximum depth of the depression. As a result, the wear indicator is also always abraded further. As soon as the worn-out regions of the respective tooth, which regions are adjacent to the wear indicator, lie substantially in a plane with the maximum depth of the wear indicator or of the depression because of the abrasion, this corresponds to complete abrasion. The maximum depth which can be indicated by the wear indicator may be selected here in a manner so as to ensure that no functional losses of the individual chain wheel occur as long as said maximum depth which can be indicated by the wear indicator is not completely abraded.

In order in the best possible manner to indicate wear which occurs, the wear indicator can have a sharp color contrast in relation to the surrounding regions of the respective tooth, and therefore a worn-out surface and a surface which is not worn out can be clearly differentiated from each other. For example, for this purpose, a black anodized coating or another color intensive coating can be applied in the region of the depression.

Furthermore, a bicycle front crank arrangement can be provided which comprises a crank arm and an individual chain wheel which is attached to the bicycle crank arm. The individual chain wheel here can have one or more of the previously described features.

An individual chain wheel having one or more of the previously described features may also be provided for use in a gear-changing multiple chain wheel arrangement.

In this situation, additional impressions and/or passage recesses are to be provided on the individual chain wheel as part of a gear-changing gate. In this case, the individual chain wheel is attached together with other individual chain wheels to a bicycle crank arrangement in each case separately.

It goes without saying that the subject matter of the invention is not restricted to the embodiments described. The embodiments described and the features thereof can be combined by a person skilled in the art as desired without deviating from the subject matter of the invention. In particular, it should be pointed out that the previously described features which can be combined with one another are particularly advantageous in the configuration of individual chain wheels, in which the teeth of the first group of teeth and the teeth of the second group of teeth each have different material thicknesses. However, this is not a compulsory feature for the present invention. On the contrary, the above-described features may be used within the scope of the invention described and claimed herein, even in the case of individual chain wheels or in the case of chain wheels which are used in a multiple chain wheel arrangement, wherein said chain wheels have teeth with a substantially constant material thickness. Preferred embodiments of the invention are explained in more detail below with reference to the attached, schematic drawings.

FIG. 1 shows a detail of an individual chain wheel 10 in accordance with a first embodiment. Two teeth 12 of a first group of teeth, between which a tooth 14 of a second group of teeth is arranged, are shown in the detail here. The teeth 12 of the first group have a portion of greater material thickness, as viewed in a direction transversely with respect to the circumferential direction of the individual chain wheel 10, than the tooth 14 of the second group. Furthermore, the teeth 12 of the first group of teeth have a cross section in the shape of a plus sign or cross, as viewed from above.

The teeth 12 of the first group of teeth and the tooth 14 of the second group each comprise a load flank 16 via which force can be transmitted between the respective tooth 12, 14 and an adjacent roller of a drive chain (not shown in FIG. 1). Two lateral edges 16a, 16b, as viewed in the axial direction, of the load flank 16 are each designed in sections in a manner converging with each other radially outward, and therefore the material thickness of the respective load flank 16 decreases radially outward in an upper region, as viewed in a direction transversely with respect to the circumferential direction. This permits improved engagement of the teeth 12 in the associated gaps of the drive chain.

Each of the teeth 12 of the first group has a profile which is designed in respect of the known geometry of the drive chain (not shown) in such a manner that a designated engagement of the teeth 12 of the first group in the associated gaps of the drive chain, i.e. the gaps of the outer link plate links of the drive chain, is ensured. In a corresponding manner, the tooth 14 of the second group of teeth is geometrically designed so as to engage in the corresponding gaps of the inner link plate links of the drive chain.

The profile of the teeth 12 shown of the first group in each case comprises openings 18 in the vicinity of the flank, which are formed laterally next to the load flank 16, as viewed in the axial direction. The openings 18 in the vicinity of the flank are here set back tangentially in relation to the load flank 16. The openings 18 in the vicinity of the flank make it possible that, during engagement of the respective tooth 12 of the first group in the drive chain and an associated transmission of force between the load flank 16 belonging to the tooth 12 and an adjacent roller of the drive chain, a portion of an inner link plate of the drive chain, which portion protrudes over the roller, can engage in each case, at least in sections, in the opening 18 or the openings 18. In this case, the openings 18 are set back sufficiently far in the circumferential direction, i.e. tangentially, in relation to the load flank 16 or are spaced apart from the load flank 16 such that those portions of the inner link plates of the drive chain, which portions protrude beyond the roller, substantially do not enter into contact with that flank 18a of the opening 18 which is parallel, at least in sections, with the load flank 16.

In the embodiment shown in FIG. 1, the opening 18 extends, as viewed radially outward, as far as the upper side of the respective tooth 12 of the first group of teeth. As viewed radially inward, the opening 18 adjoins a further recess 20 which extends substantially in the circumferential direction of the individual chain wheel 10 past the adjacent tooth 14 of the second group between two teeth of the first group of teeth and connects the opening 18 in the vicinity of the flank to a rear opening 22 of the next tooth 12 of the first group of teeth. Said rear opening 22 is formed in this case on a side, opposite the load flank 16, of the closest tooth 12, as viewed in the circumferential direction, of the first group of teeth.

The load flanks 16 of the teeth 12, 14 have comparatively shallow load flank angles in comparison to load flanks of known individual chain wheels. By means of this formation of comparatively shallow load flank angles, the transmission of force between a plurality of consecutive teeth 12, 14 of the individual chain wheel 10 and the drive chain is distributed to a plurality of load flanks 16, as a result of which the local surface pressure on each tooth is reduced, and which overall brings about a reduction in wear. The effect achieved by this is that the rollers of the drive chain do not dig too far into the load flanks 16 because of the wear. It is therefore possible to prevent those portions of the inner link plates of the drive chain, which portions protrude beyond the rollers, from entering into contact with the opening flanks 18a of the openings 18, which would lead to blocking of the drive chain and would therefore oppose a disengagement of the drive chain and the teeth 12, 14 of the individual chain wheel 10. What is referred to as "chain suck" can therefore be effectively prevented by a reduction in wear.

In order to securely hold the drive chain radially despite the comparatively shallow load flank angles of the load flanks 16 during engagement on the individual chain wheel 10, such that the drive chain does not inadvertently jump off or jump over, at least the teeth 12 of the first group each have a hook-shaped projection 24 which is connected to the load flank 16. The hook-shaped projection 24 protrudes in each case in relation to the load flank 16, as viewed tangentially, and adjoins the load flank 16 radially outward. The projection 24 here connects the load flank 16 to the upper side of the tooth 12 of the first group of teeth.

During engagement of the drive chain and the individual chain wheel 10, the projection 24 engages, at least in sections, over an adjacent roller of the drive chain and therefore secures the drive chain against inadvertently jumping off or jumping over in this region.

The projection 24 here is designed in such a manner that, although the projection secures the drive chain against inadvertently jumping off, said projection does not obstruct a functional disengagement of the individual chain wheel 10 and of the drive chain in the empty strand.

As can be seen in FIG. 1, the tooth 14 of the second group of teeth also has the shallow load flank angle, which is described with respect to the teeth 12 of the first group of teeth, of the load flank 16 and an associated projection 24.

Figure 2:
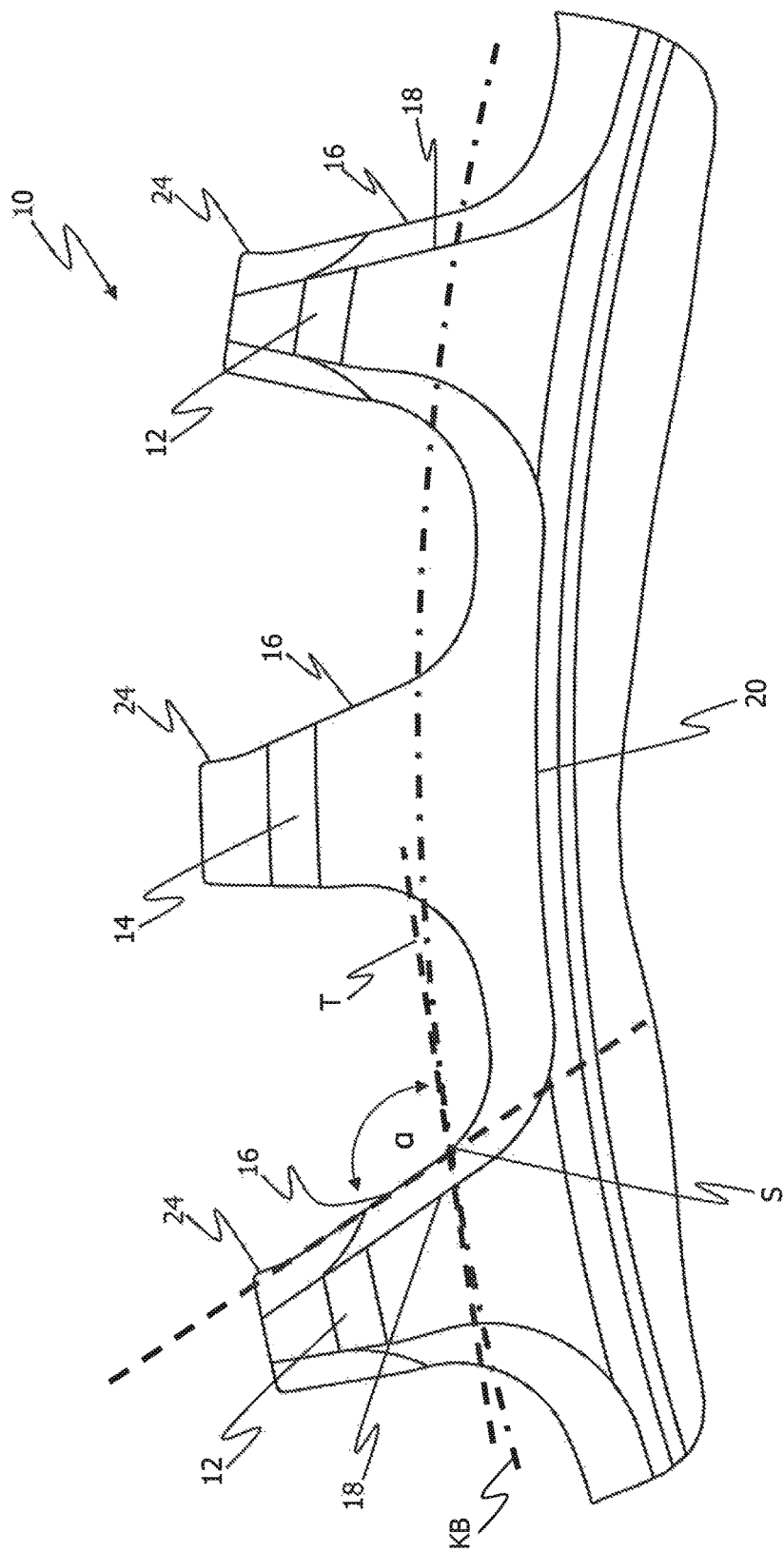
FIG. 2 shows a side view of the detail shown in FIG. 1.

FIG. 2 shows a side view of the detail, which is illustrated in FIG. 1, of the individual chain wheel 10 according to the first embodiment. FIG. 2 illustrates in this case additional auxiliary lines for calculating the load flank angles of the load flanks 16.

An arc KB of a circle which is concentric with respect to the chain wheel 10 intersects the load flank 16 at a point S. The point S at the same time constitutes the touching point of the tangent T of the arc of the circle KB. In the illustration shown in FIG. 2, the tangent T together with the load flank 16 spans an angle $\alpha$ which describes the load flank angle of the load flank 16. The load flank angle $\alpha$ refers in each case to that angle between the load flank 16 and the tangent T that is greater than 90°.

In the embodiment shown in FIG. 2, the load flanks 16 have a load flank angle $\alpha$ of approximately 120°, wherein a design of load flanks with load flank angles within the region of 110° to 125° is also possible.

In the embodiments that are described below, the same reference signs as in the above-described first embodiment are used for components which are identical or act in an identical manner. However, for the embodiments, a consecutive number, beginning at 1, precedes said reference signs. The components which are not described again in the further embodiments correspond in the design and function thereof to the corresponding components of the first embodiment. For the sake of clarity, the reference signs of individual components are partly omitted in the associated figures of the further embodiments.

Figure 4:
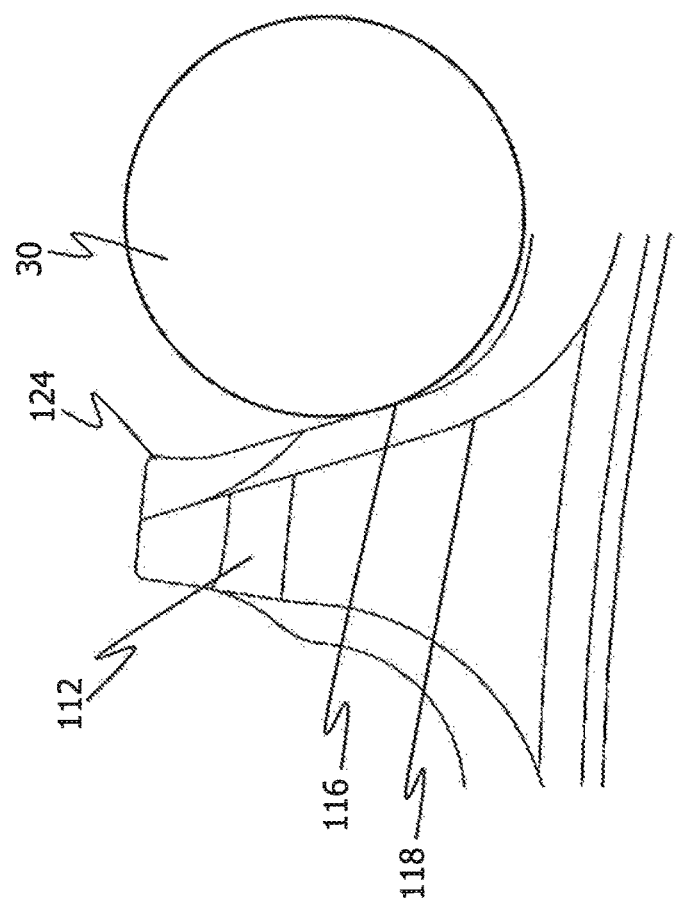
FIG. 4 shows a side view of the tooth shown in FIG. 3 with a roller adjacent thereto.
Figure 3:
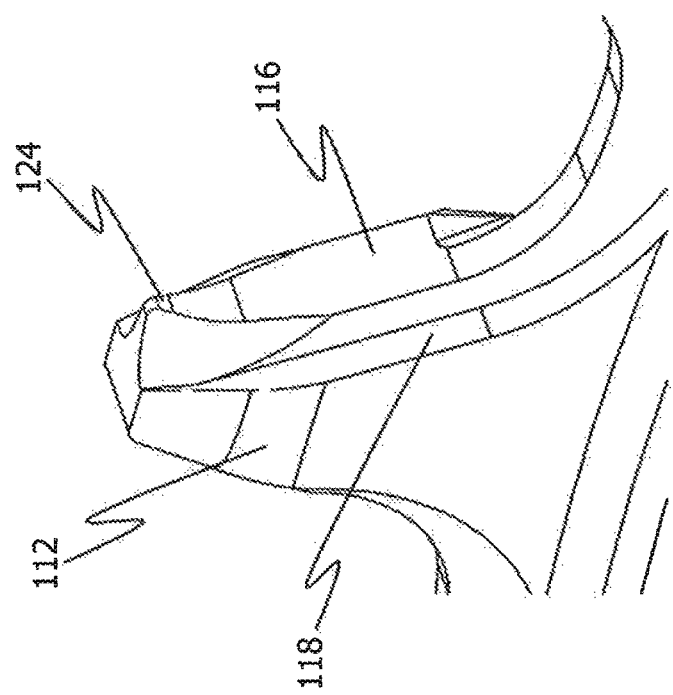
FIG. 3 shows a perspective view of a tooth of a first group of teeth of an individual chain wheel according to a second embodiment.

FIGS. 3 and 4 show a tooth 112 of the first group of teeth according to a second embodiment, wherein, in addition, FIG. 4 schematically illustrates a roller 30, which is adjacent to the tooth 112, of the drive chain. The tooth 112 of the second embodiment substantially corresponds to the teeth 12, which are shown in FIGS. 1 and 2, of the first group of teeth according to the first embodiment. The sole difference in relation to the first embodiment is that the tooth 112 of the first group of teeth of the further embodiment has a substantially T shaped cross section, as viewed from above (radially on the outside).

Figure 5:
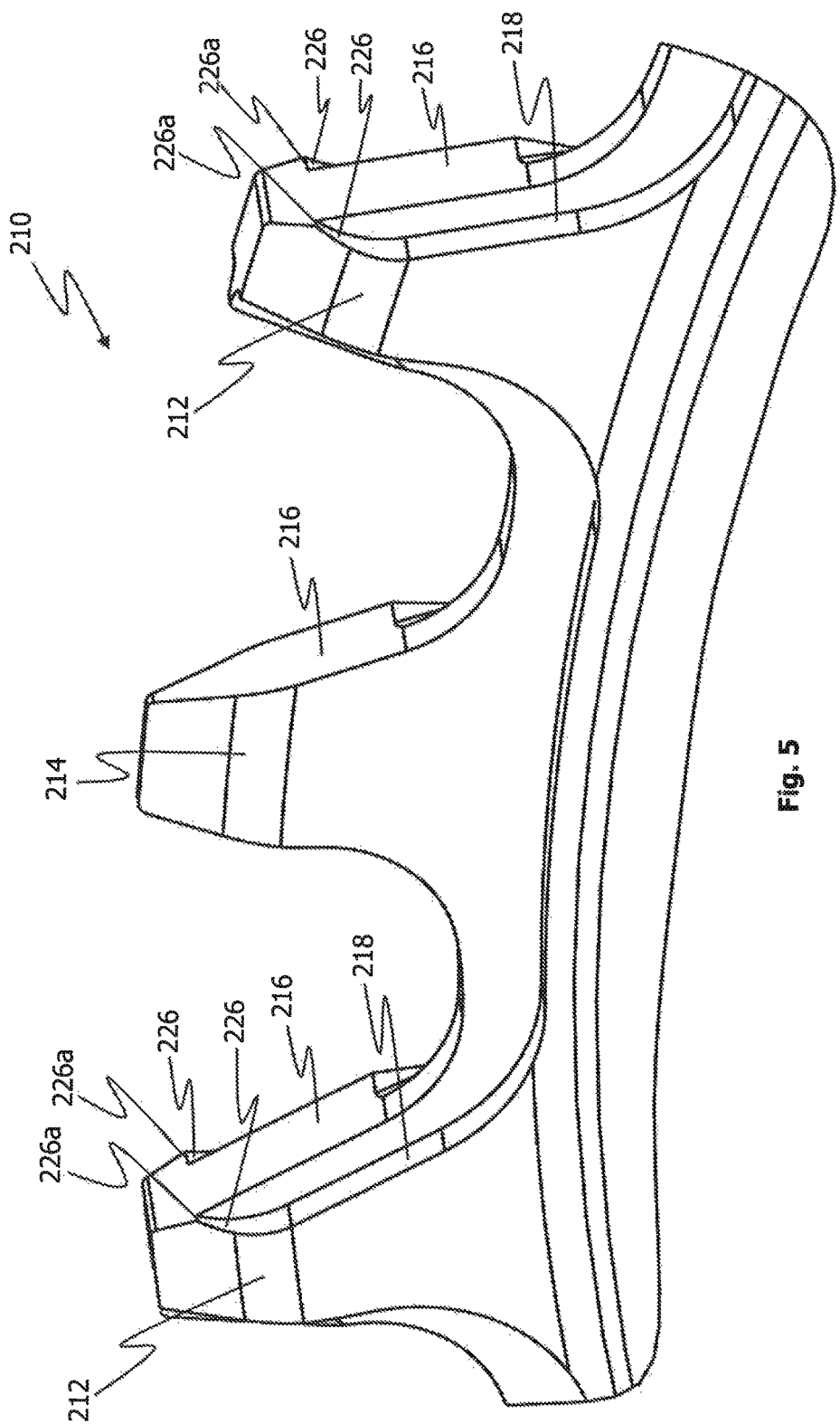
FIG. 5 shows a perspective view of a detail of an individual chain wheel according to a third embodiment.

FIG. 5 shows a detail of an individual chain wheel 210 in accordance with a third embodiment. Here, as in FIG. 1, two teeth 212 of a first group of teeth are shown, between which teeth a tooth 214 of a second group of teeth is arranged. The teeth 212 of the first group have a greater material thickness, as viewed in a direction transversely with respect to the circumferential direction of the individual chain wheel 210, than the tooth 214 of the second group. The teeth 212 of the first group of teeth of the third embodiment also have a cross section in the shape of a plus sign or cross, as viewed from above.

In contrast to the first embodiment, a projection is not provided on the load flank 216 of the teeth 212, 214 of the third embodiment. The load flank 216 in FIG. 5 therefore extends rectilinearly in each case from the rounding in the region of the tooth root as far as the upper side of the teeth 212, 214.

However, in the third embodiment, a projection 226 is provided, in each case in the vicinity of the tooth crest, in the opening 218, which is in the vicinity of the flank, of the teeth 212 of the first group of teeth. As shown in FIG. 5, the projections 226 are in each case arranged at an end of the openings 218 located radially on the outside and run by means of a radially outer edge 226a into a region of the load flank 216 located radially on the outside. Accordingly, in a region above the edges 226a of the projections, the load flank 216 has a greater width, as viewed transversely with respect to the circumferential direction, than below said edges 226a.

During engagement of the drive chain and of the individual chain wheel 210, the projections 226 in the openings engage, at least in sections, over a portion of the inner link plate (not shown) of an adjacent drive chain and therefore secure the latter against inadvertently jumping off or jumping over in said region. In other words, a portion of an inner link plate of the drive chain can be blocked by means of each of the projections 226 in order to oppose a jumping-off without impeding a desired disengagement of the drive chain and of a tooth under consideration.

The load flanks 216 of the teeth 212, 214 of the third embodiment likewise have a shallow load flank angle of approximately 120°, wherein the formation of a load flank angle differing therefrom is also possible here.

Figure 6:
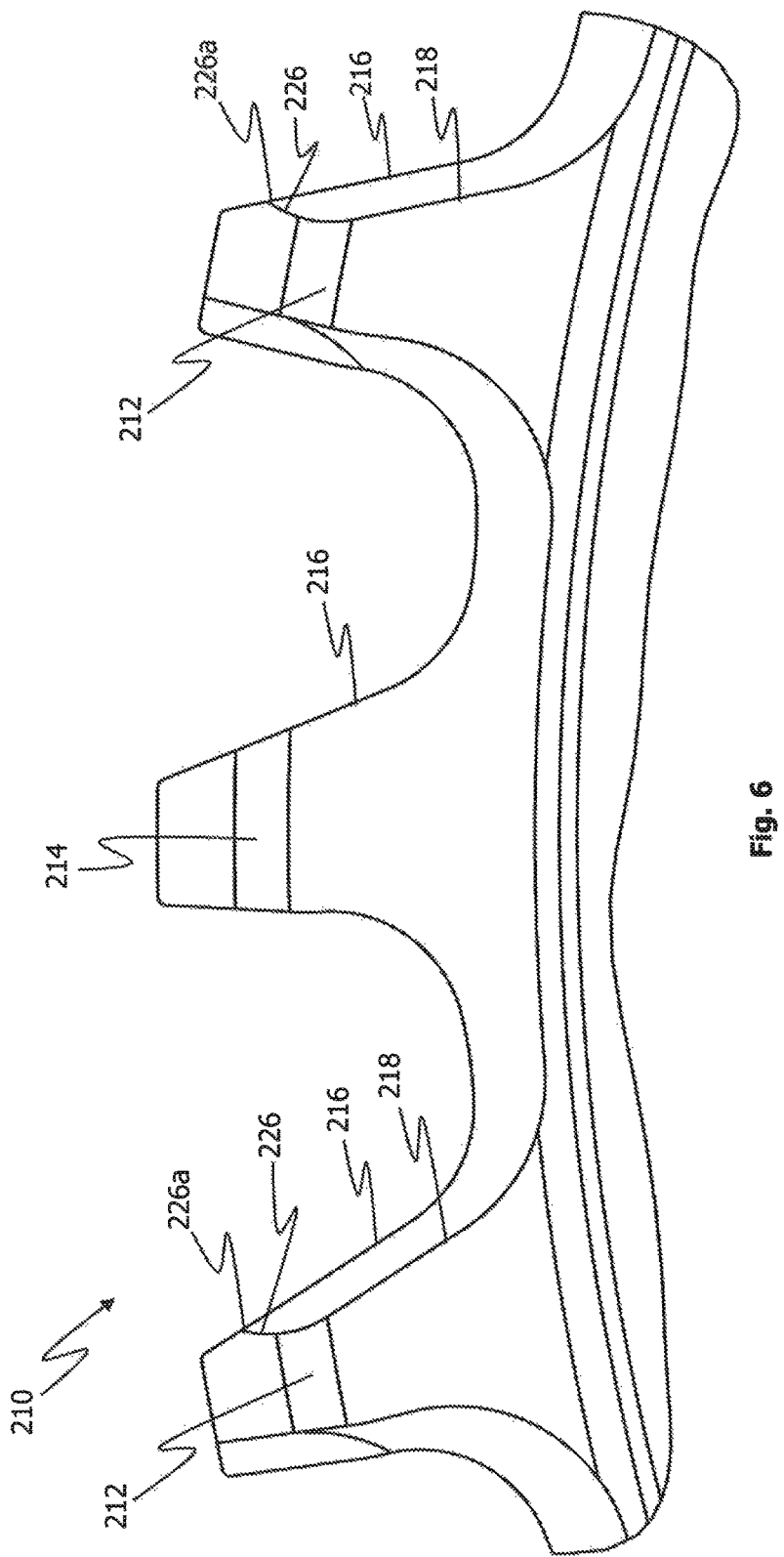
FIG. 6 shows a side view of the detail shown in FIG. 5.

FIG. 6 shows the detail, illustrated in FIG. 5, of the individual chain wheel 210 of the third embodiment in a side view.

Figure 8:
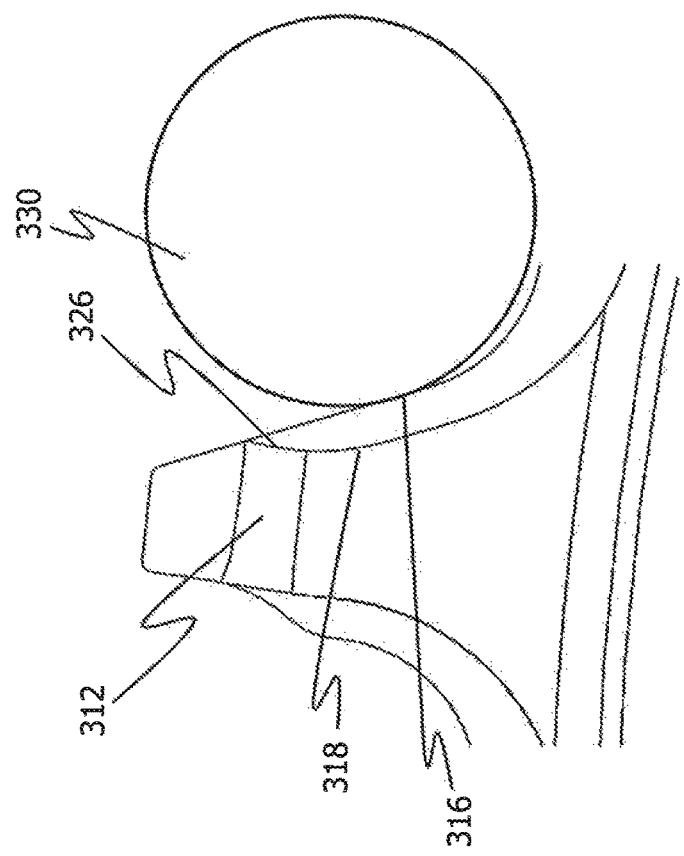
FIG. 8 shows a side view of the tooth shown in FIG. 7 with a roller adjacent thereto.
Figure 7:
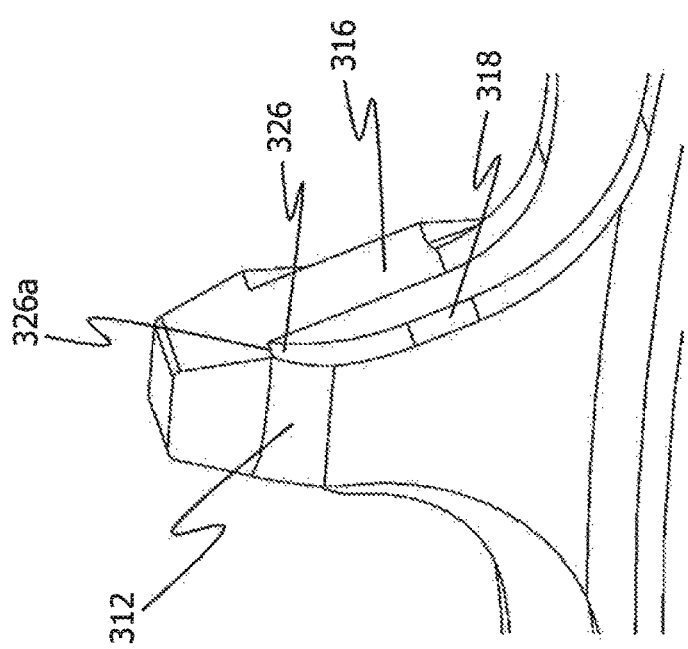
FIG. 7 shows a perspective view of a tooth of a first group of teeth of an individual chain wheel according to a fourth embodiment.

FIGS. 7 and 8 each show a tooth 312 of the first group of teeth according to a fourth embodiment, wherein FIG. 8 also shows a roller 330, which is adjacent to the tooth 312, of the drive chain. The tooth 312 of the second embodiment substantially corresponds to the teeth 212, shown in FIGS. 1 and 2, of the first group of teeth according to the third embodiment (FIGS. 5 and 6). The only difference in relation to the third embodiment is that the tooth crest of the teeth 212 of the first group of teeth of the fourth embodiment has a substantially T shaped cross section, as viewed from above, whereas the tooth crest of the teeth 312 is of rectangular design, as viewed from above.

Figure 9:
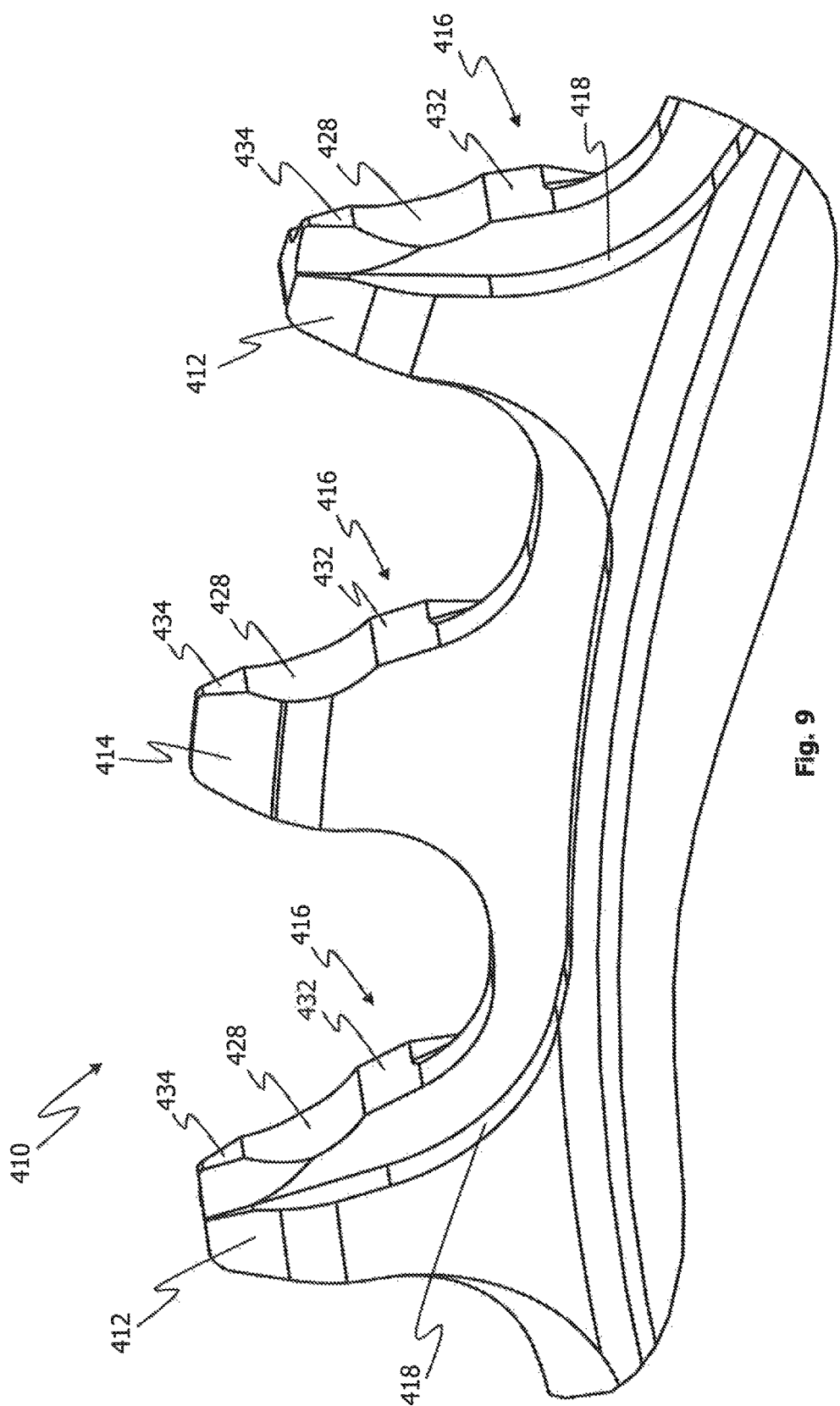
FIG. 9 shows a perspective view of a detail of an individual chain wheel according to a fifth embodiment.

FIG. 9 shows a further detail of an individual chain wheel 410 according to a fifth embodiment with teeth 412 of a first group of teeth and a tooth 414, arranged in between, of a second group of teeth. Also in this embodiment, the teeth 412 of the first group of teeth have a greater material thickness, as viewed in a direction transversely with respect to the circumferential direction, than the tooth 414 of the second group of teeth. In the fifth embodiment, the tooth crests of the teeth 412 of the first group of teeth are shown with a substantially T shaped cross section, as viewed from above, but the formation of a known cross section in the shape of a cross or plus sign is alternatively also possible here.

The teeth 412, shown in FIG. 9, of the first group of teeth and teeth 414 of the second group of teeth are similar in the design thereof to the teeth 12, 14 of the first embodiment shown in FIG. 1. However, no projections are provided on the teeth shown in FIG. 9. By contrast, the teeth 412, 414 according to the fifth embodiment each comprise a recess 428 which is arranged in the region of the respective load flank 416.

The recess 428 has a curved contour and extends in each case over the entire load flank 416, as viewed in a direction transversely with respect to the circumferential direction. In an upper portion of the recess 428, the material thickness of the respective recess 428 is decreasing radially outward, as viewed in a direction transversely with respect to the circumferential direction.

The load flanks 416 of the teeth 412, 414 shown in FIG. 9 each have a first load flank portion 432 and a second load flank portion 434 which are recess-free and are rectilinear, as viewed in axial side view. The first load flank portion 432 is in this case formed adjacent to the recess 428 radially inward with respect to the central axis of rotation of the individual chain wheel 410. In a corresponding manner, the second load flank portion 434 is formed adjacent to the recess 428 radially outward. The material thickness of the second load flank portion 432, like the upper portion of the recess 428, is decreasing radially outward, as viewed in a direction transversely with respect to the circumferential direction.

The recess 428 of the respective load flank 416 is arranged here in a region of the load flank 416, in which an edge is formed during operation in the case of known individual chain wheels because of wear or because of rollers of the drive chain digging into the load flank. Such a wearing edge in the load flank would obstruct a disengagement of the teeth and of the drive chain. A wearing edge forming during operation because of such a configuration of the individual chain wheel is therefore effectively prevented by means of the recess 428, and therefore a roller in engagement with the respective tooth can continue to slip freely even in the event of being subjected to severe stressing and despite wear.

The two rectilinear load flank portions 432, 434, as viewed in axial side view, are aligned with each other and, in the embodiment shown, have the same shallow load flank angle of approximately 115°, wherein a formation of load flank angles differing therefrom is also possible. For example, the load flanks 416 of the fifth embodiment may alternatively also have steep load flanks as per known individual chain wheels.

Figure 10:
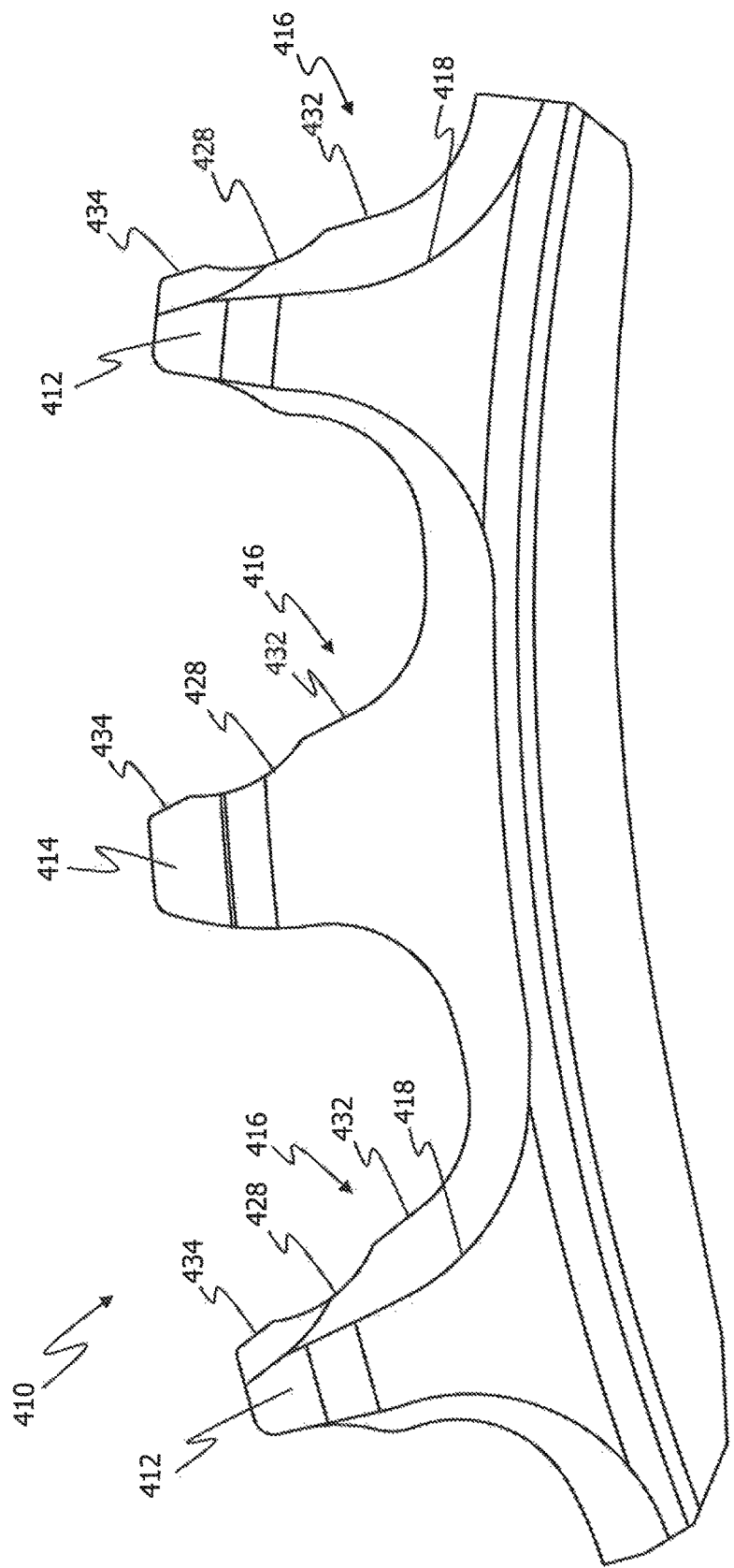
FIG. 10 shows a side view of the detail shown in FIG. 9.

FIG. 10 shows the fifth embodiment, shown in FIG. 9, in a side view.

Figure 11:
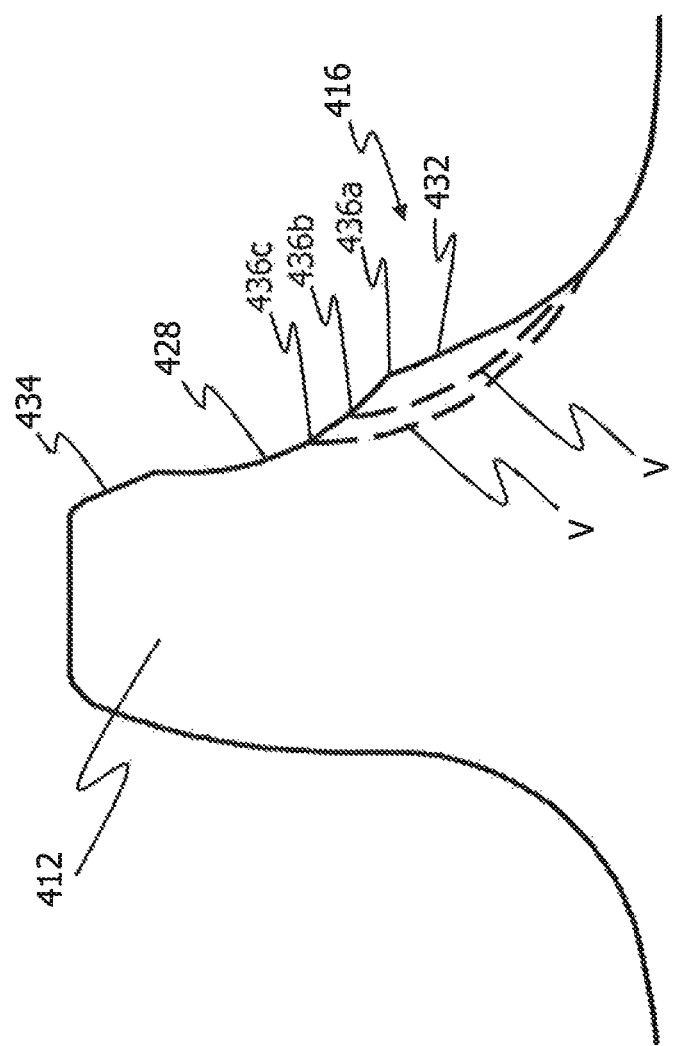
FIG. 11 shows a schematic illustration of wear to a tooth of the first group of teeth of an individual chain wheel according to the fifth embodiment.

FIG. 11 is a schematic illustration of a contour of a tooth 412 of the first group of teeth according to the fifth embodiment, wherein wear occurring during operation is illustrated with the aid of dashed lines V. It can be seen that a roller (not shown) interacting with the tooth 412 digs in substantially in a region of the first load flank portion 432 and in a lower region of the recess 428, in which the greatest transmission of load takes place during operation. However, as is likewise shown, the wear-induced digging-in of the adjacent roller does not result in any edge formation which would block free slipping of the roller. By means of the recess 428 which is set back in relation to the load flank 416, it is ensured that an edge 436a, 436b, 436c arising due to the wear only protrudes minimally, if at all, beyond the load flank 416, as viewed in the circumferential direction, and does not obstruct the roller.

Figure 12:
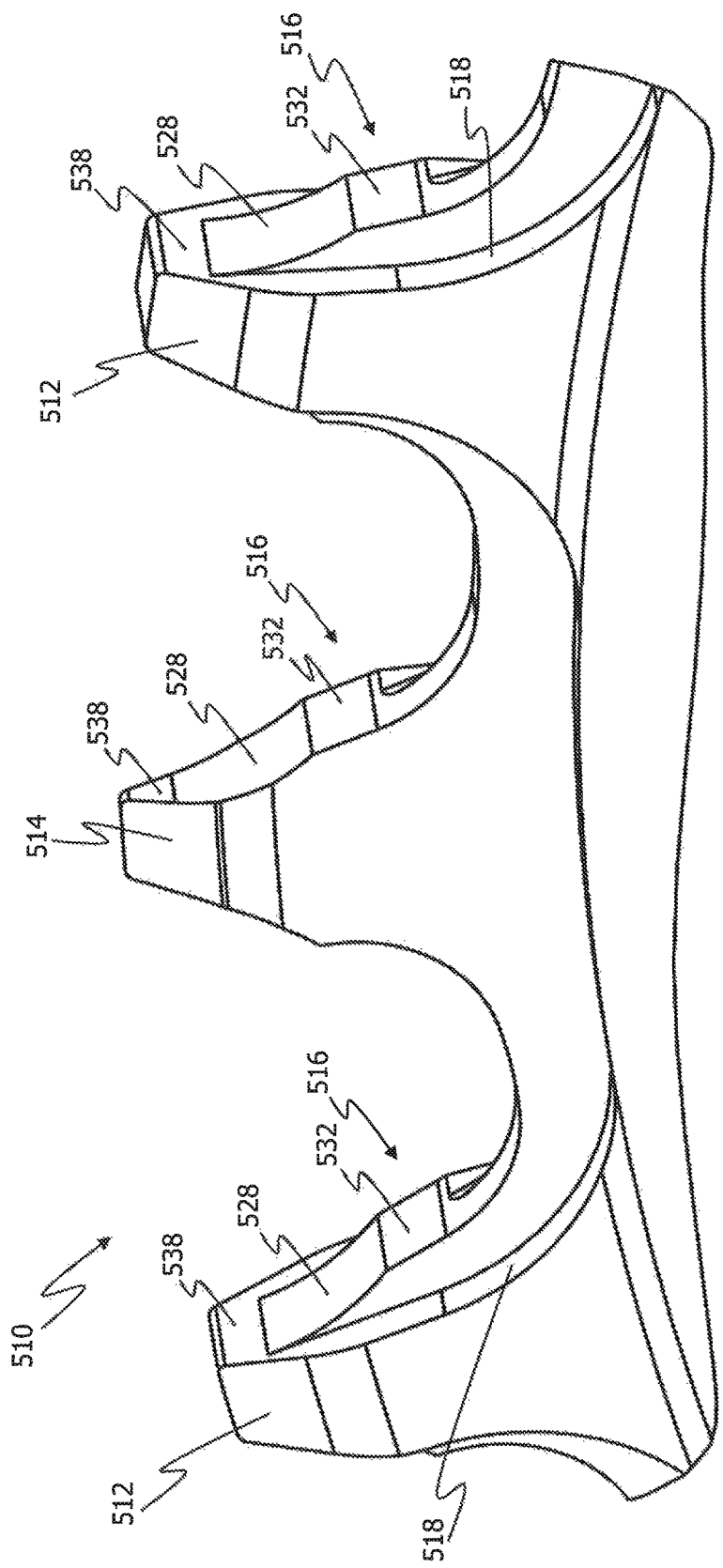
FIG. 12 shows a perspective view of a detail of an individual chain wheel according to a sixth embodiment.

It should be noted that, in a departure from FIG. 11, it is also possible for wear states to arise in which the wear line 436c may also be the same depth as the wear line 436b, wherein the wear lines "move" toward the recess 428. Conditions of this type may arise, for example, because of a wear induced elongation of the chain simultaneously to the wear shown on the load flank, for example in the form of the wear lines 436b, c. As an alternative to the fifth embodiment, FIG. 12 shows a detail of an individual chain wheel 510 according to a sixth embodiment. The sixth embodiment substantially corresponds to the fifth embodiment, but the teeth 512, 514 of the individual chain wheel 510 of the sixth embodiment each have a load flank 516 with just a first load flank portion 532 and no second load flank portion.

Said first load flank portion 532 is adjacent to a curved recess 528 radially inward with respect to the central axis of rotation of the individual chain wheel 410. The recess is adjacent to a side surface 538 of the respective tooth 512, 514, as viewed radially outward.

Said side surface 538 of the teeth 512 of the first group of teeth lies here, as viewed in the circumferential direction, substantially in a plane with an adjacent upper end portion of the openings 518 in the vicinity of the flank, which can serve for saving costs during production of the individual chain wheel 510.

The manner of operation of the recess 528 according to the sixth embodiment substantially corresponds to the manner of operation of the associated recess 428, described with respect to the fifth embodiment.

Figure 13:
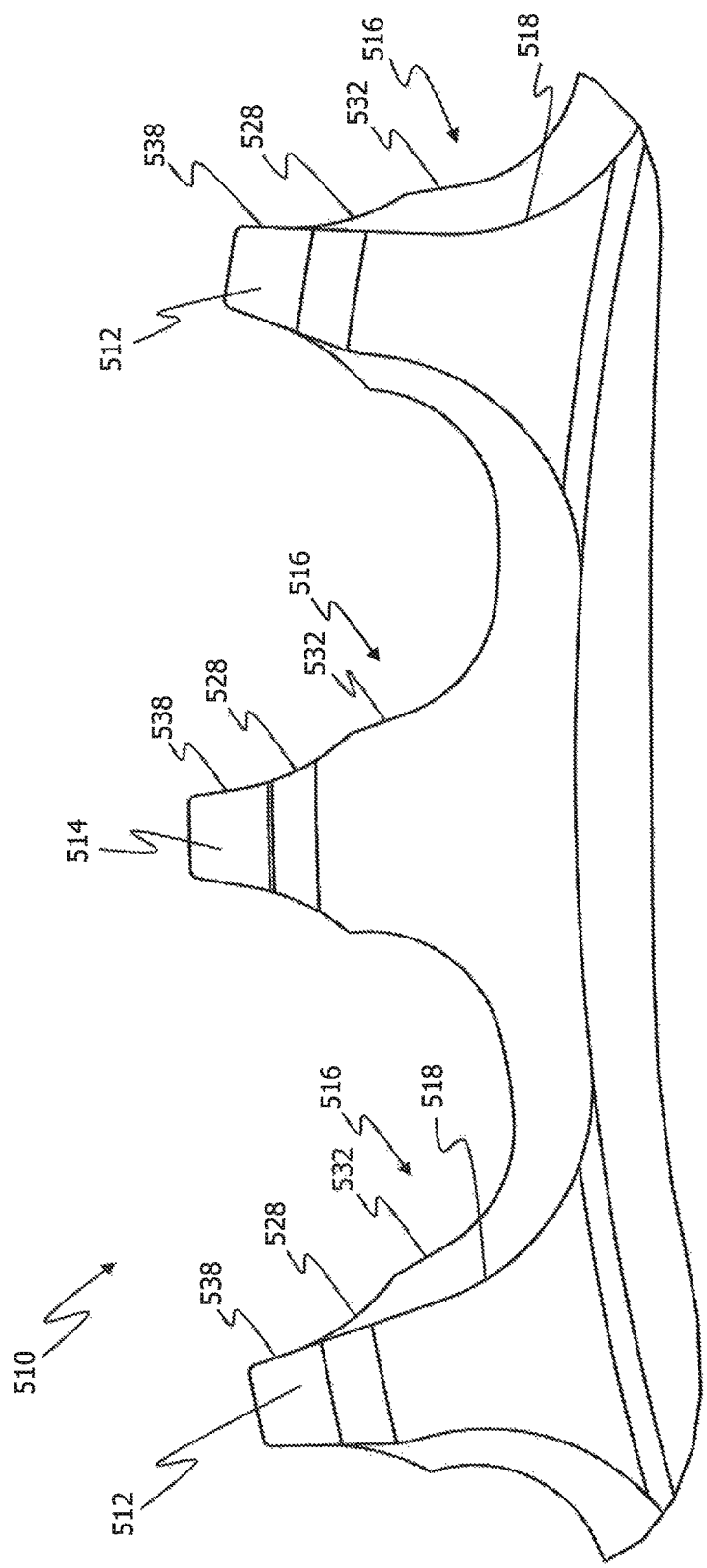
FIG. 13 shows a side view of the detail shown in FIG. 12.

FIG. 13 shows the detail, shown in FIG. 12, of the individual chain wheel 510 in a side view.

FIGS. 14 to 17 each show a detail of a symmetrically designed individual chain wheel 610 according to a seventh embodiment, in which openings are provided in each case on both tooth flanks of each tooth 612 of the first group of teeth. The teeth are therefore formed substantially symmetrically with respect to the axis containing centre plane thereof. Recesses and/or projections are not illustrated in FIGS. 14 to 17, but it goes without saying that a symmetrically designed individual chain wheel 610 according to the seventh embodiment may also have one or more features of the previously described embodiments.

Figure 14:
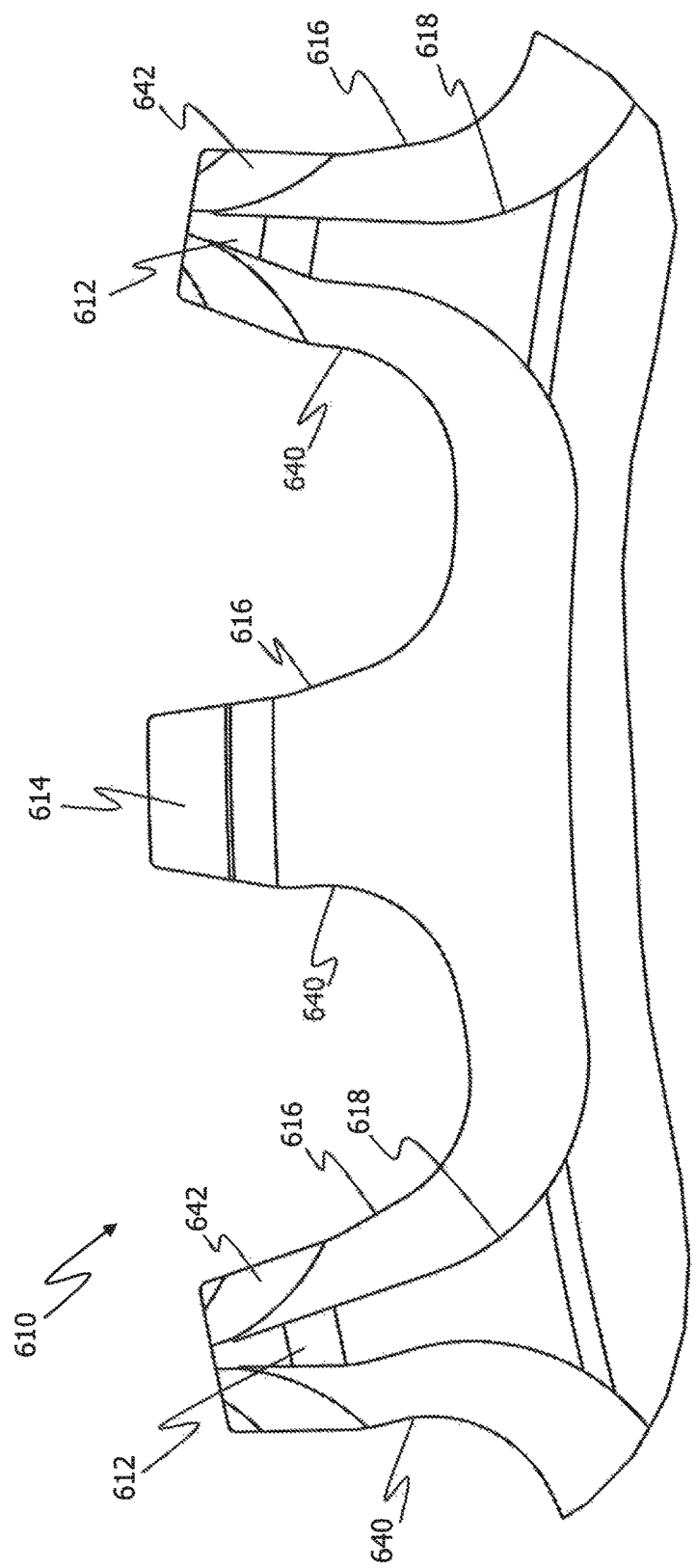
FIG. 14 shows a side view of a detail of an individual chain wheel according to a seventh embodiment.

FIG. 14 shows a side view of the detail of the individual chain wheel 610 of the seventh embodiment. In this embodiment, each of the teeth 612, 614 of the first and second group of teeth have counterload flanks 640 on a side opposite the respective load flank 616, as viewed in the circumferential direction. The counterload flank 640 here is in each case formed substantially symmetrically with respect to the associated load flank 616 of the tooth 612, 614 under consideration. This symmetrical formation on both sides applies equally to the openings 618 in the vicinity of the flank and the bevellings 642 which serve for improved engagement in the chain gaps and reduce the material thickness of the tooth under consideration radially outward.

A symmetrically designed individual chain wheel 610 of this type permits production in an advantageous manner in terms of time and cost. In addition, an individual chain wheel 610 of this type can be used on both sides, i.e. in opposite running directions. If one side of the individual chain wheel 610, for example the side having the load flanks 616, has reached a wear limit, said individual chain wheel can be repositioned in a mirror inverted manner, as it were, on the front wheel crank of the bicycle such that, after the repositioning, the counterload flanks 640 enter into interaction with the rollers of the drive chain. The service life of the individual chain wheel 610 can thereby be doubled.

Figure 15:
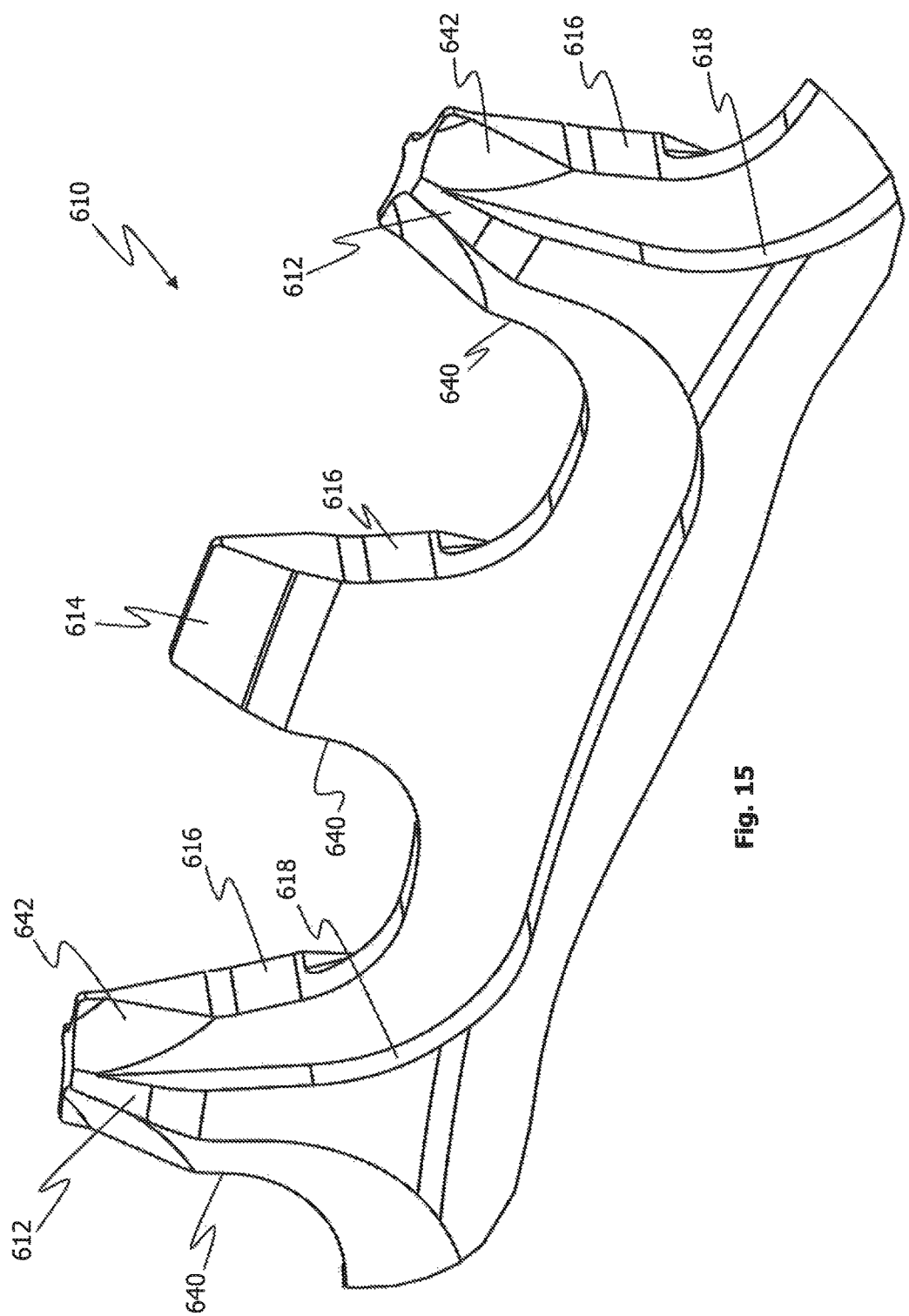
FIG. 15 shows a perspective view of the detail shown in FIG. 14.
Figure 16:
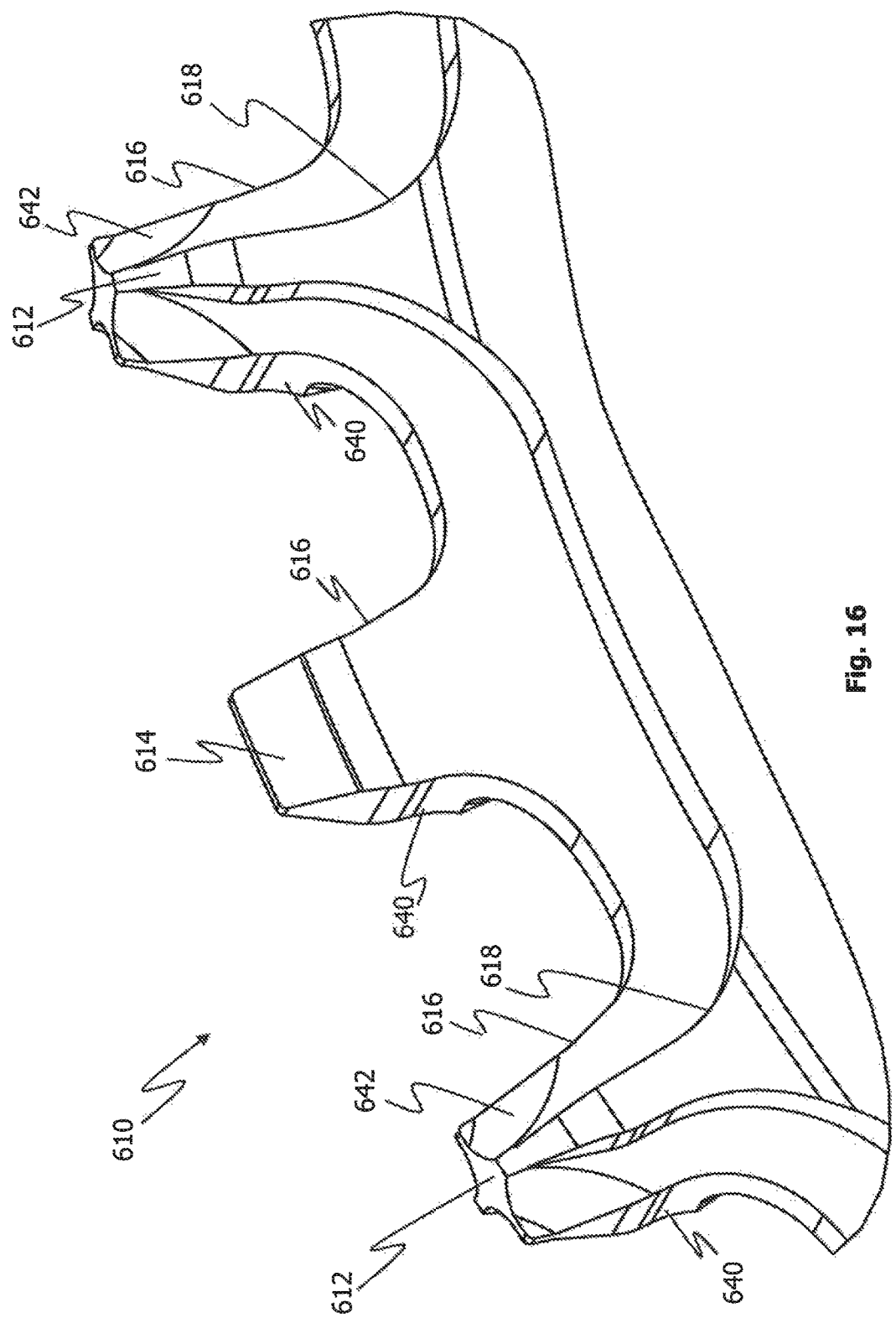
FIG. 16 shows a further perspective view of the detail shown in FIG. 14.

FIGS. 15 and 16 show the detail of the symmetrical individual chain wheel 610 in a perspective illustration in each case.

Figure 17:
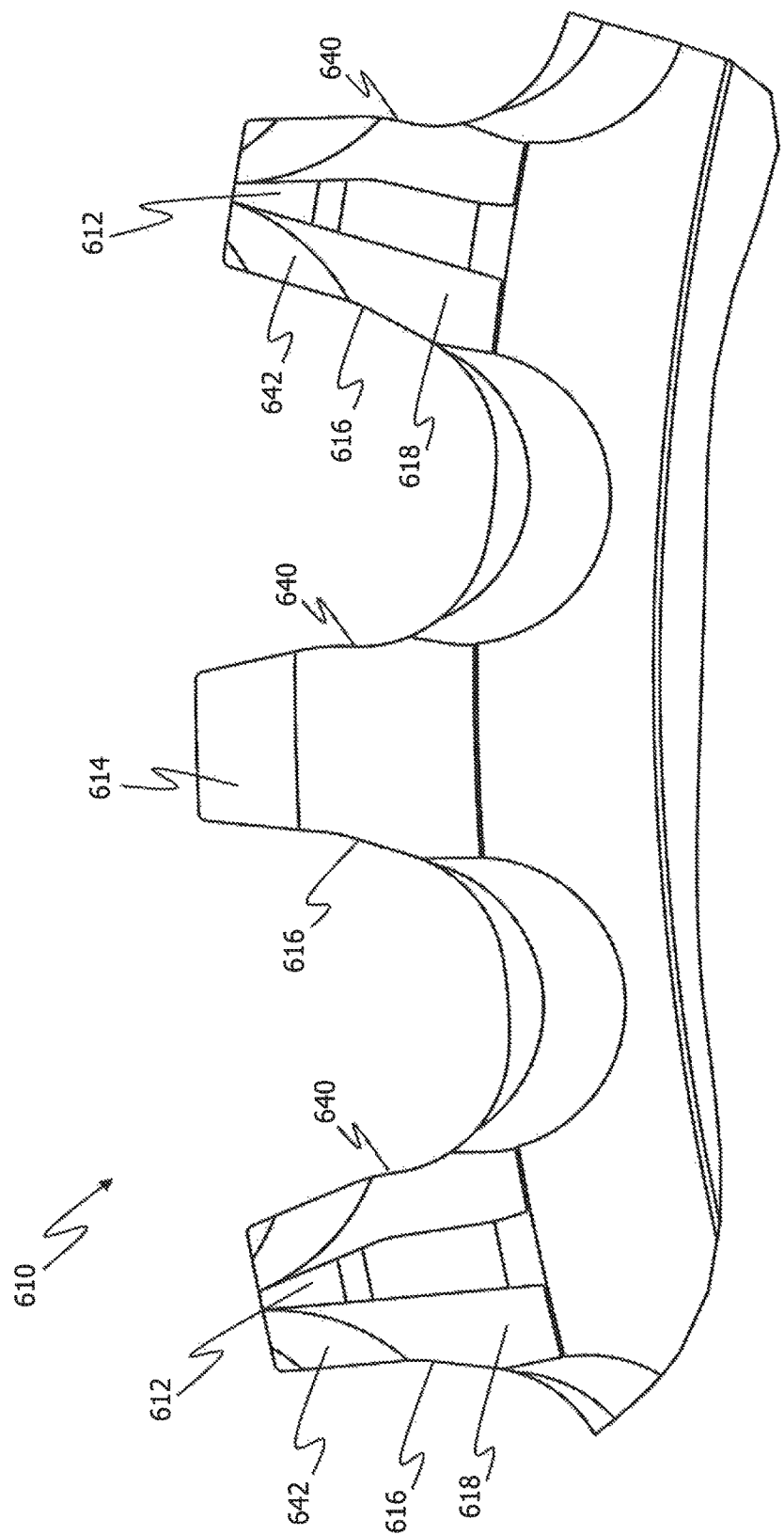
FIG. 17 shows a rear side view of the detail shown in FIG. 14.

FIG. 17 likewise shows the detail, shown in FIGS. 14 to 16, of the individual chain wheel 610 according to the seventh embodiment in a side view from an opposite side, as viewed in the axial direction.

Figure 18:
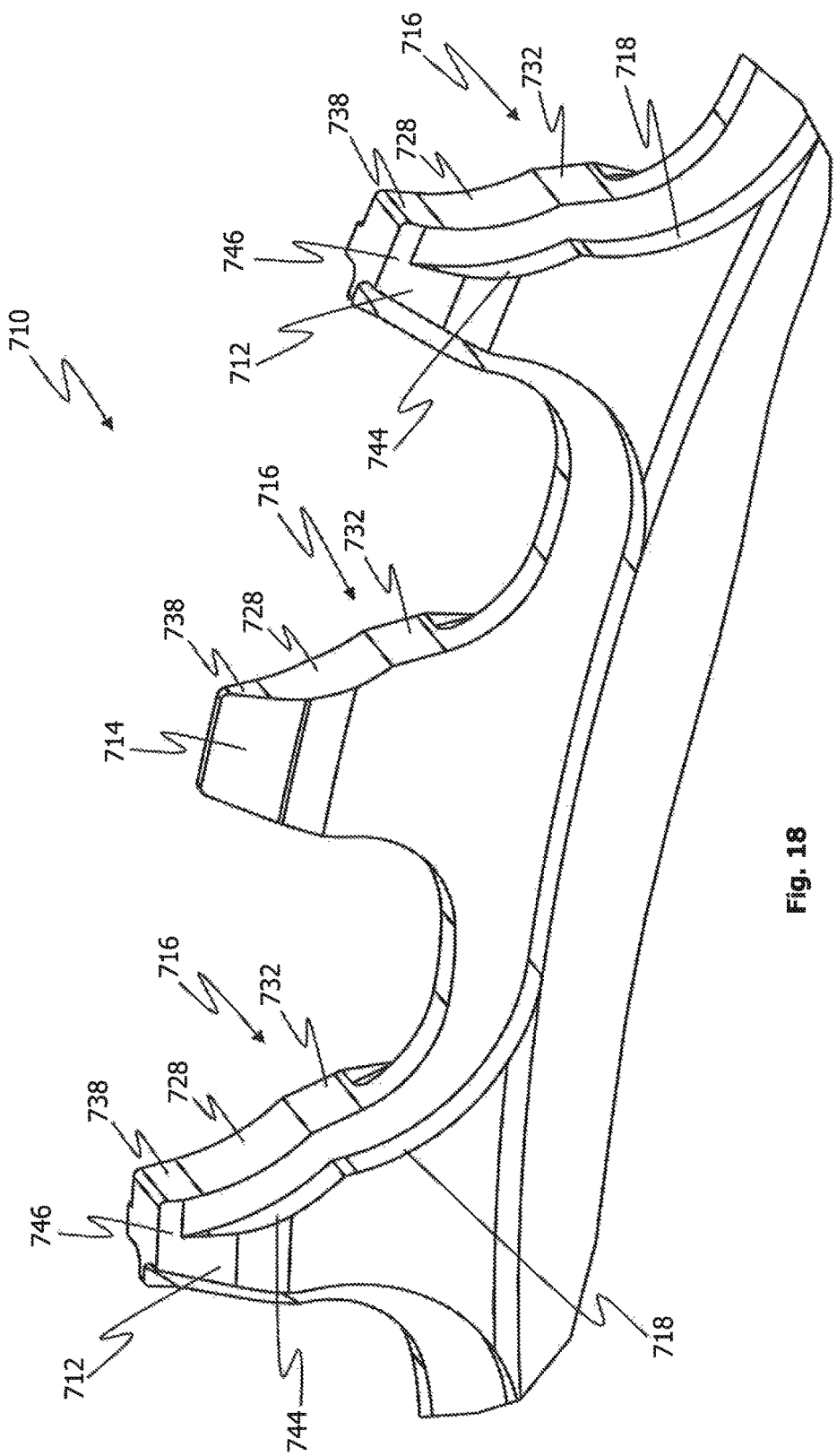
FIG. 18 shows a perspective view of a detail of an individual chain wheel according to an eighth embodiment.

FIG. 18 shows a detail of an individual chain wheel 710 according to an eighth embodiment. The individual chain wheel 710 of the eighth embodiment substantially corresponds to the sixth embodiment shown in FIGS. 12 and 13, wherein the teeth 712 of the first group of teeth each have a cross section substantially in the shape of a cross or plus sign, as viewed from above.

The teeth 712 of the first group of teeth each comprise a load flank 716 with a first load flank portion 732 which is provided adjacent to a recess 728 radially inward. The recess 728 is adjacent radially outward to a side surface 738 of the respective tooth 712 of the first group of teeth. Both the first load flank portion 732 and the recess 728 have here a continuous width or material thickness, as viewed in a direction transversely with respect to the circumferential direction.

The recess 728 here has the same manner of operation as the recess 528 of the sixth embodiment or the recess 428 of the fifth embodiment.

In contrast to the sixth embodiment, the opening 718 of the eighth embodiment has an opening portion 744 set back by a greater distance in relation to the load flank 716, as viewed in the circumferential direction. The set back opening portion 744 extends substantially adjacent to the contour of the recess 728 and, in the illustration shown, has substantially the same distance in relation to the recess 728 as the opening 718 has in relation to the adjacent first load flank portion 732.

The material thickness of the set back opening portion 744 decreases radially outward, as viewed in a direction transversely with respect to the circumferential direction, like the upper portion of the tooth 712 under consideration of the first group of teeth. The opening portion 744 is adjacent here radially outward at an upper end point of the opening portion 744 to a tooth portion 746 which does not comprise an opening in the vicinity of the flank.

Figure 19:
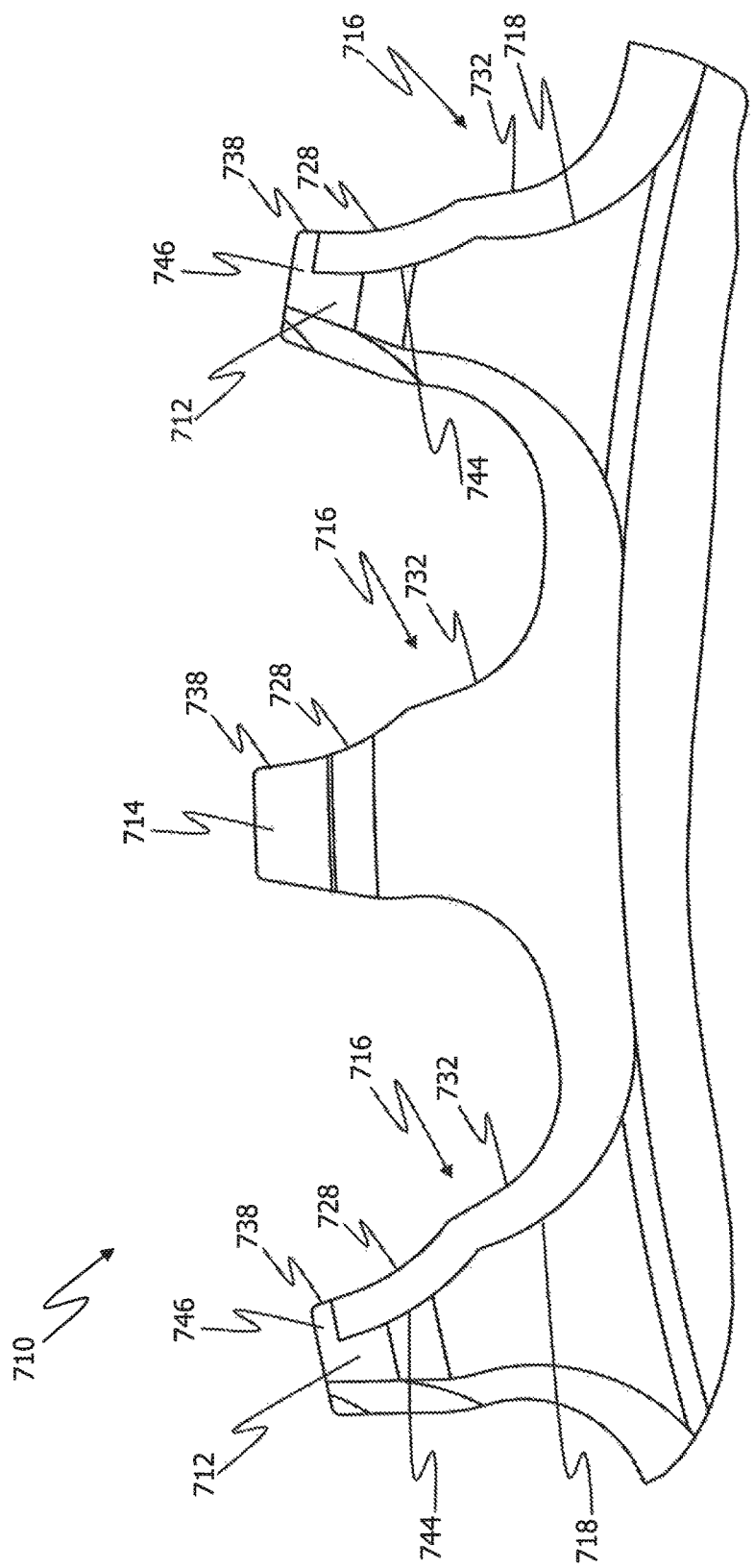
FIG. 19 shows a side view of the detail shown in FIG. 18.

FIG. 19 shows a side view of the detail, shown in FIG. 18, of the individual chain wheel 710 according to the eighth embodiment.

Figure 20:
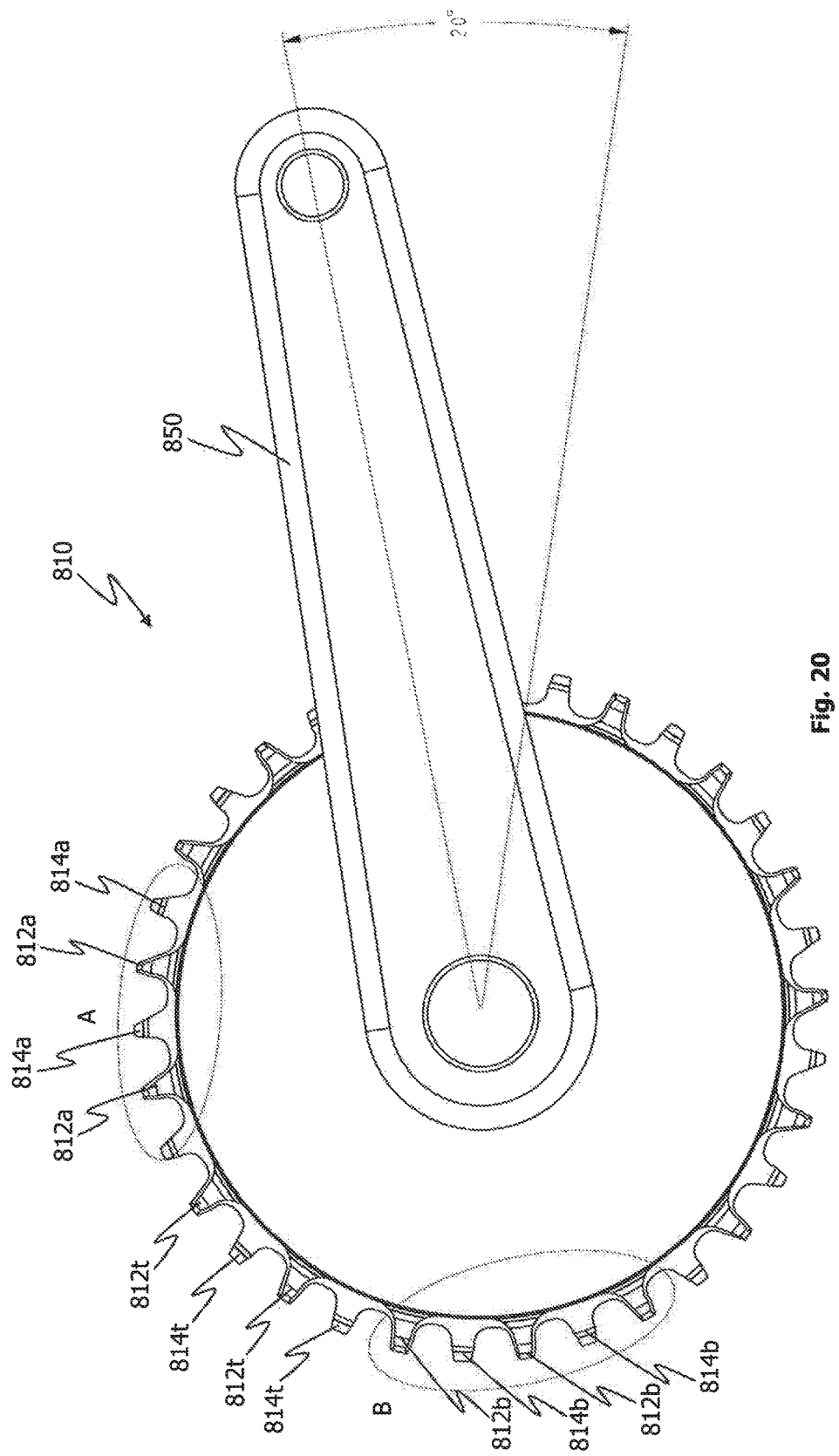
FIG. 20 shows a side view of a foot pedal arrangement with an individual chain wheel according to a ninth embodiment.
Figure 21:
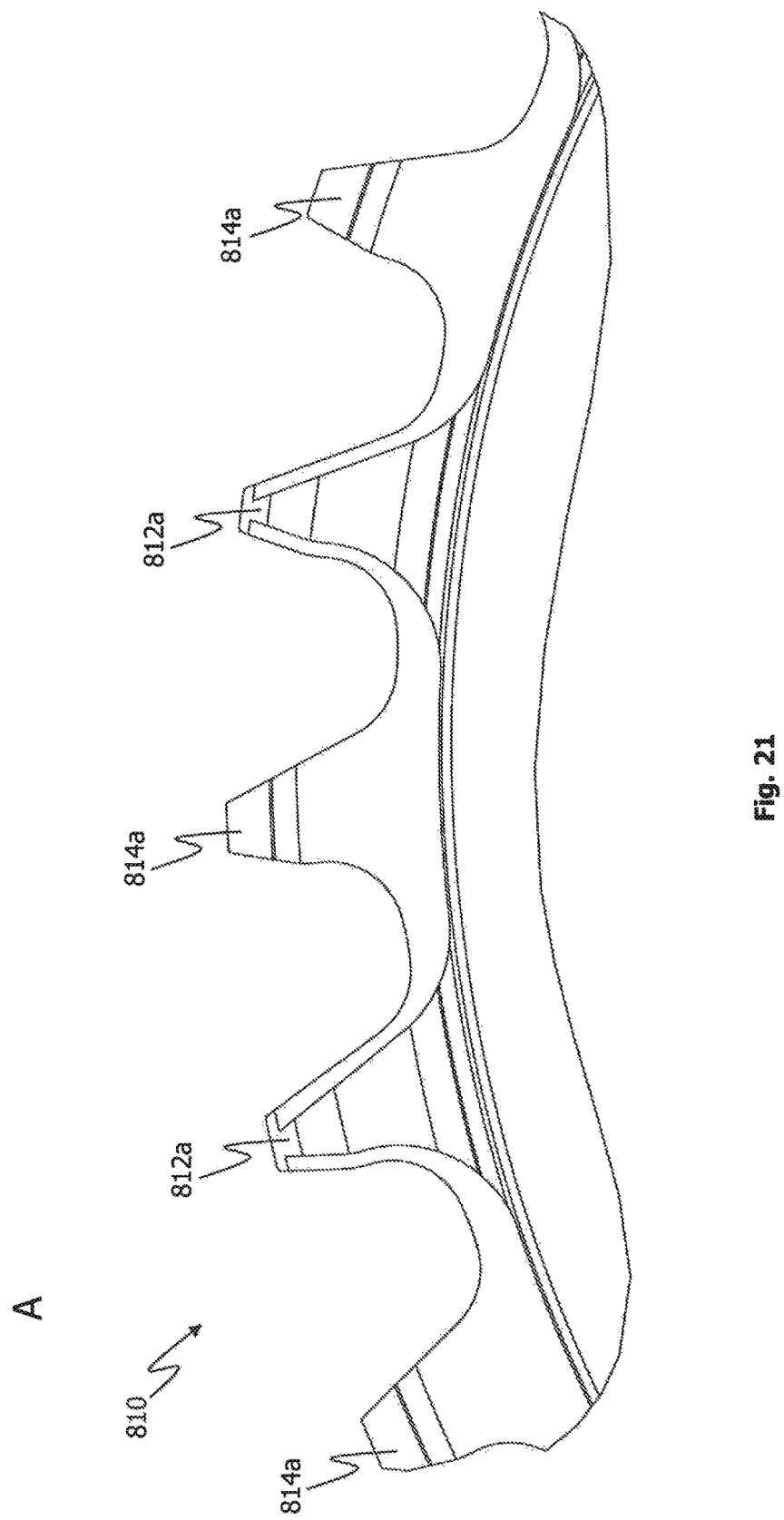
FIG. 21 shows the detail A from FIG. 20 in enlarged form.
Figure 22:
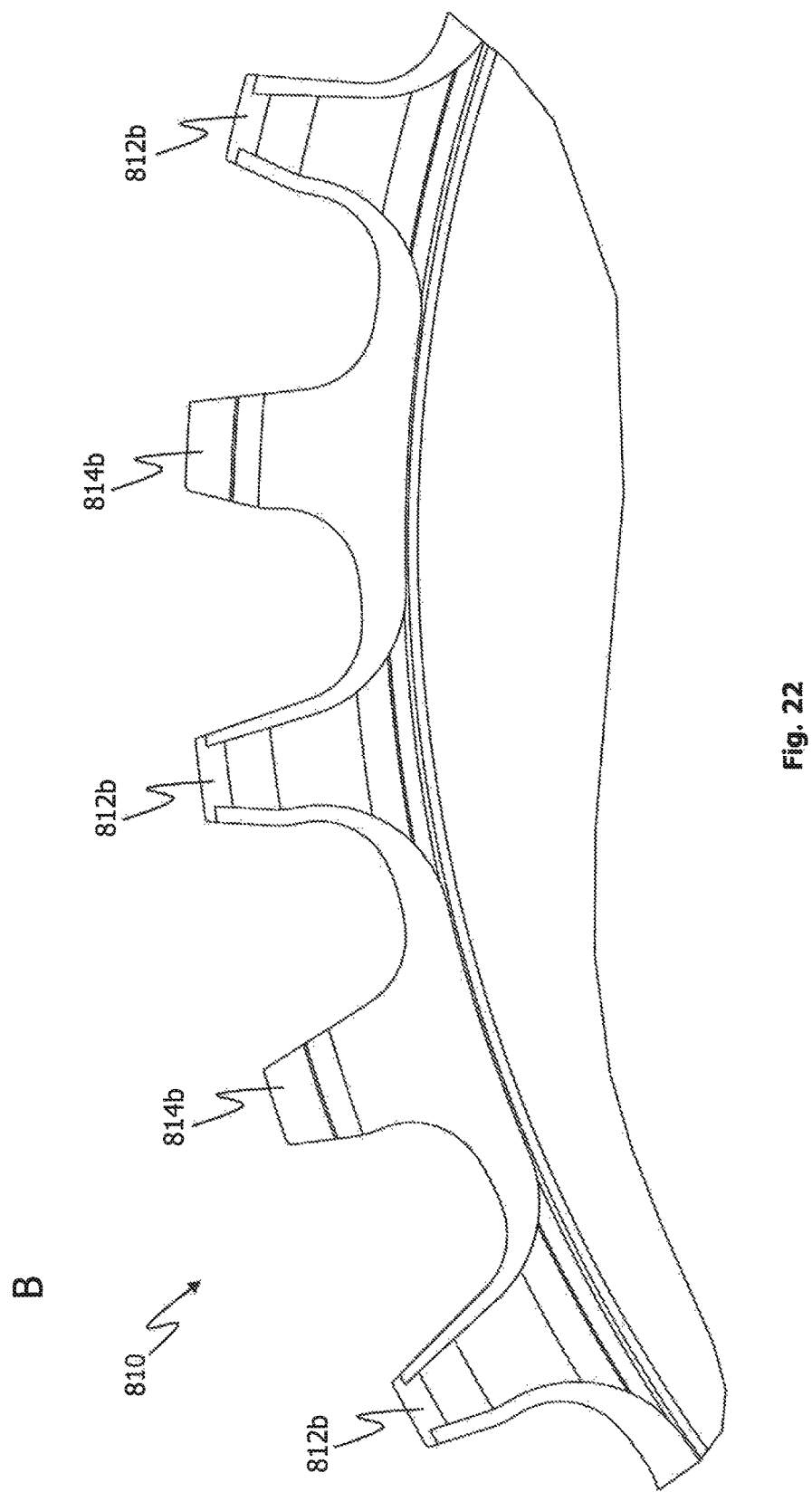
FIG. 22 shows the detail B from FIG. 20 in enlarged form.

FIGS. 20-22 show a ninth embodiment, the special features of which can also be used independently of the above described features, in particular independently of the above described load flank design in the case of conventional individual chain wheels, for example in the case of individual chain wheels having a substantially constant material thickness for all of the teeth. In said ninth embodiment, the individual chain wheel has tooth regions A and B, the teeth of which have different load flank angles. The teeth 812a and 814a of the tooth region A are thus formed with a tooth flank with a flatter profile than the teeth 812b and 814b of the tooth region B. This is also seen in a comparison of FIGS. 21 and 22, wherein FIG. 21 shows the teeth of the tooth region A and FIG. 22 shows the teeth of the tooth region B. The teeth 812a and 814a of the tooth region A and the teeth 812b and 814b of the tooth region B are formed substantially symmetrically with respect to the respective axis containing centre plane thereof and have features according to the description above, namely an opening parallel to the respective tooth flank in the region of the teeth 812a, b of the first group of teeth and teeth 814a, b with reduced material thickness.

FIG. 20 shows the individual chain wheel 810 in a foot pedal arrangement with a foot pedal 850. The tooth regions A, B are arranged in such a manner that a tooth region B with teeth 812b and 814b having the steep tooth flanks lies in the region which is covered by the foot pedal 850—as viewed in the axial direction—, and in the opposite region of the chain wheel 810, which region is offset with respect to the first region by 180°. The tooth regions A are offset by 90° in each case with respect to the tooth regions B. Between the two tooth regions A and B, it is possible to provide transition teeth having load flank angles which, in terms of size, lie between the load flank angles of the teeth of the tooth regions A and B. It is thus possible that, starting from the teeth 812a and 814a which have relatively shallow load flank angles within the region around 120°, transition teeth 812t, 814t having a continuously rising, i.e. steeper, load flank angle are provided, wherein the load flank angle of the transition teeth 812t, 814t is smaller than the load flank angle of the teeth 812b and 814b in the tooth region B, which load flank angle lies in terms of size within a region around 105°. If the individual chain wheel 810 is mounted onto a foot pedal arrangement, the tooth region A having teeth with shallower load flank angles is positioned in such a manner that, during operation, the chain then runs off from said tooth region A approximately tangentially if specifically a large pedalling force is exerted on the foot pedal arrangement by the cyclist, for example if the foot pedal is at the angle shown of 20°.

Figure 23:
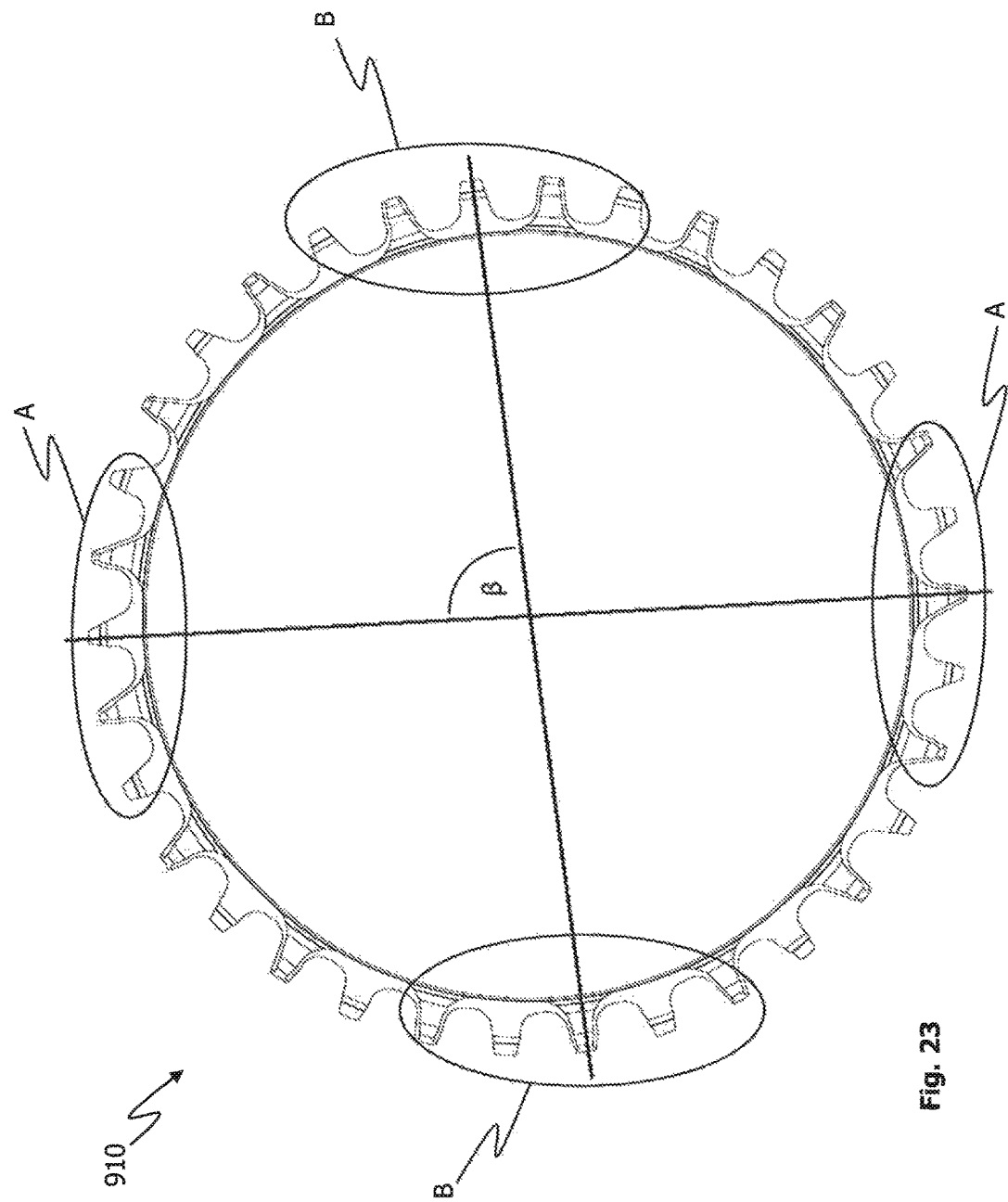
FIG. 23 shows an alternative configuration of the individual chain wheel according to FIG. 20.

FIG. 23 shows a modification of the embodiment according to FIGS. 20 22, wherein it is seen that, in the case of the individual chain wheel 910 there, the tooth regions A and B are not offset with respect to each other precisely by 90°, but rather are arranged slightly asymmetrically at an offset angle β or (180°−β) with respect to each other, wherein the offset angle β is approximately 85°.

Figure 24:
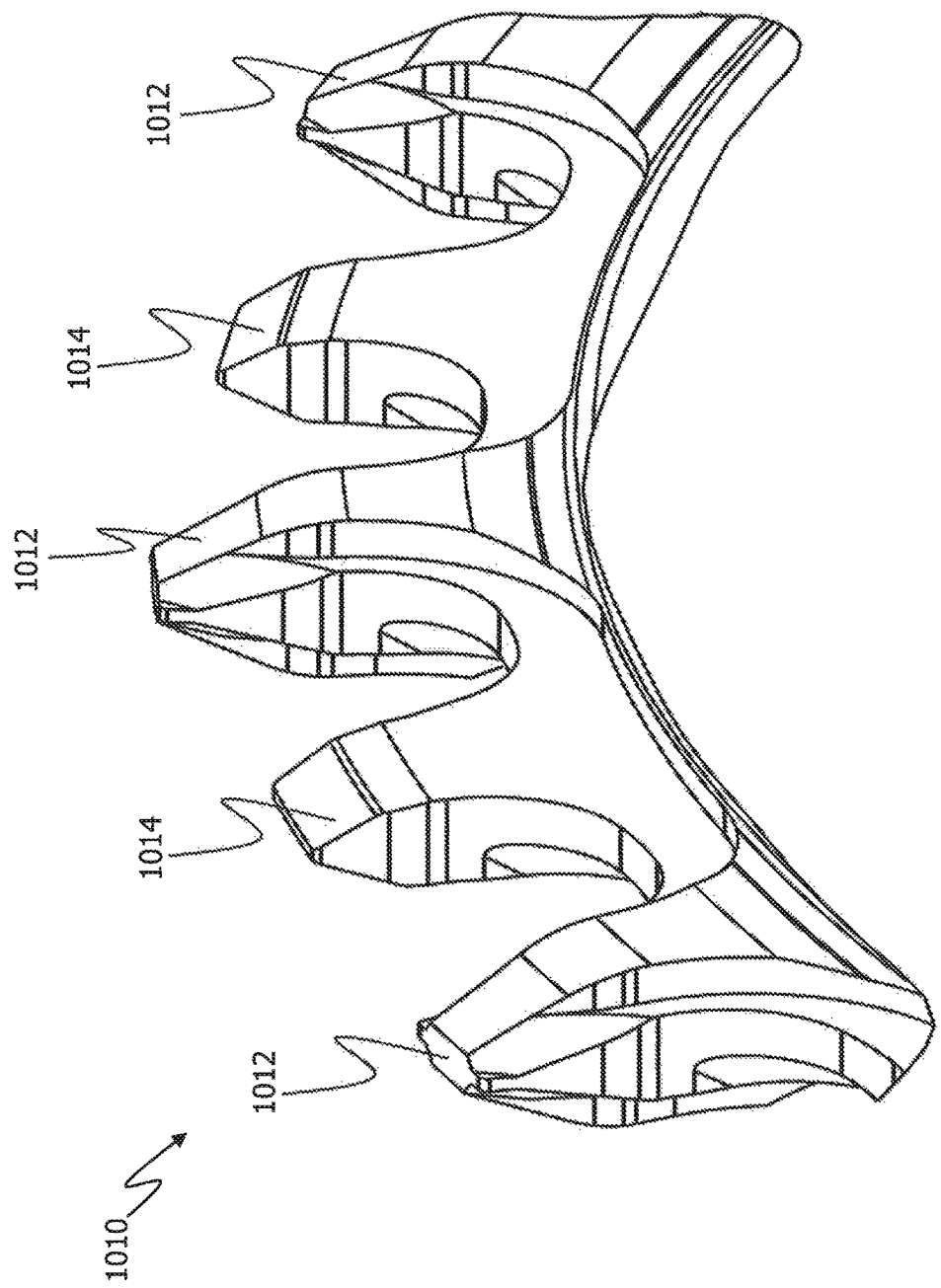
FIG. 24 shows a perspective detail of an individual chain wheel according to a tenth embodiment.
Figure 25:
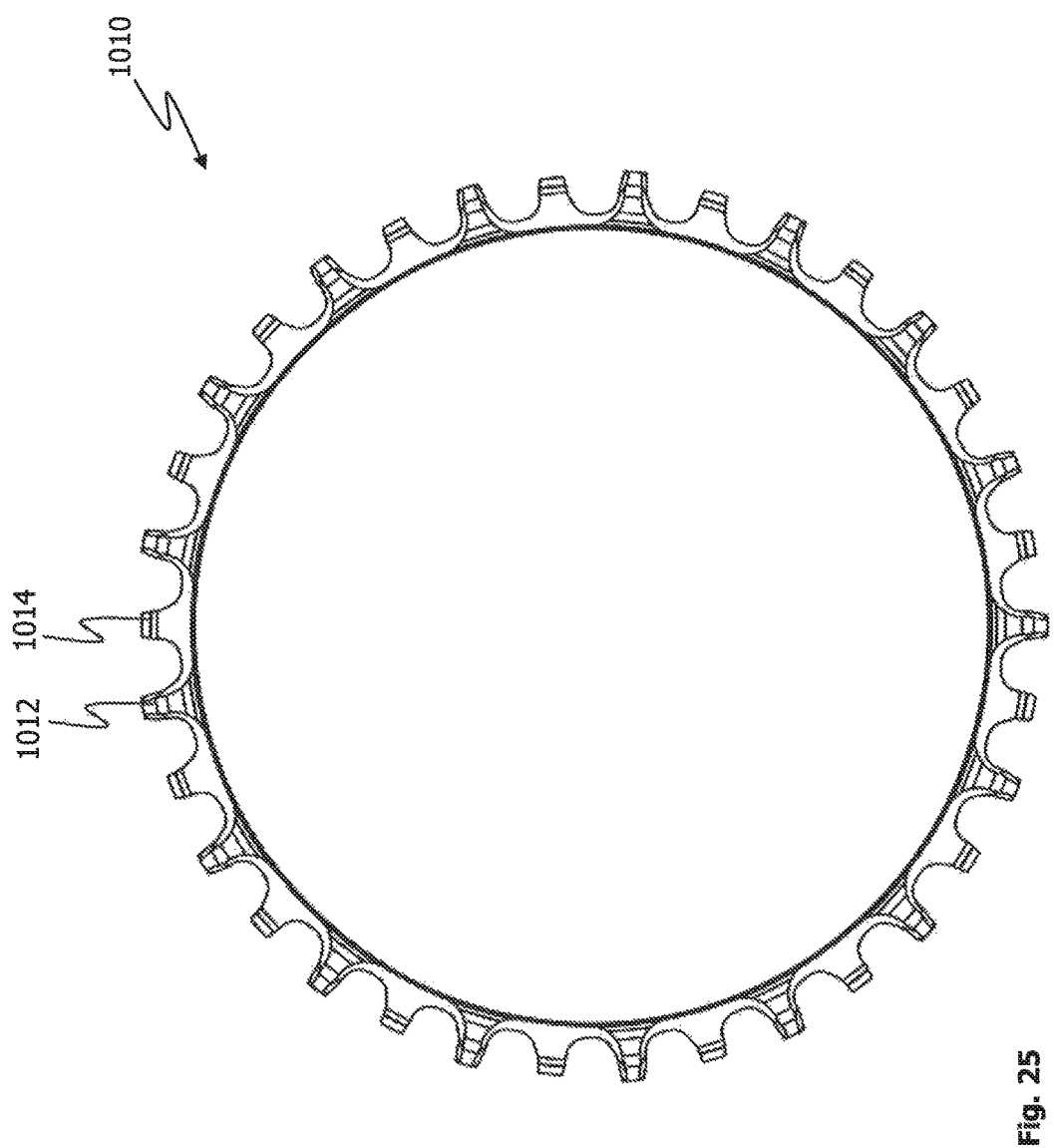
FIG. 25 shows the individual chain wheel according to FIG. 24 in an overall illustration.

The embodiment according to FIGS. 24 26 shows an individual chain wheel 1010 which has teeth 1012, 1014 which correspond in the geometrical configuration thereof in respect of the tooth flanks and the material thickness substantially to the configuration according to the embodiment according to FIG. 14. However, in the embodiment of the individual chain wheel 1010, the teeth 1014 of the second group of teeth are reduced in the height thereof in the radial direction in relation to the teeth 1012 of the first group of teeth. The height of the teeth 1014 is approximately 85% of the height of the teeth 1012. It is thus possible to achieve a state in which the teeth 1012 can more easily be introduced into the gaps between the link plates, even if the chain is inclined more steeply, with the link plates each being prevented from striking against the radially outwardly facing surface of the respective tooth crest. Instead, the effect achieved by this design is that the teeth and the link plates are always in contact in such a manner that the link plates slide down laterally on the tooth surface when the chain enters into engagement with the respective tooth.

This is shown in the sectional illustration according to FIG. 26a for the phases A1 to A5 for the thin teeth 1014 of the second group of teeth and in the sectional illustration according to FIG. 26b for the phases B1 to B5 for the racing scene material thickness 1012 of the first group of teeth. It is seen in FIG. 26a that the link plate KL, which is shown in cross section, approaches (A1) the tooth 1014 from above, then, upon further rotation of the individual chain wheel, the link plate KL comes laterally into contact (A2) by means of a bevel with the tapered tooth crest of the tooth 1014, in consequence slides down (A3) on the tapered tooth crest of the tooth 1014 until being guided (A4) in contact with the substantially rectilinearly extending side surface of the tooth 1014 and finally passing into a state of maximum engagement between the tooth 1014 and the chain in the region of the link plate KL (A5).

The same phases then consequently arise if the individual chain wheel is rotated further and the next link plate KL enters into engagement with the following tooth 1012 of the first group of teeth having a greater material thickness. This is shown in FIG. 26b. It is seen in FIG. 26b that the link plate KL, which is shown in cross section, approaches (B1) the tooth 1012 from above, then, upon further rotation of the individual chain wheel, the link plate KL comes laterally into contact (B2) by means of a bevel with the tapered tooth crest of the tooth 1012, in consequence slides down (B3) on the tapered tooth crest of the tooth 1012 until being guided (B4) in contact with the substantially rectilinearly extending side surface of the tooth 1012 and finally passing into a state of maximum engagement between the tooth 1012 and the chain in the region of the link plate KL (B5).

Figure 28:
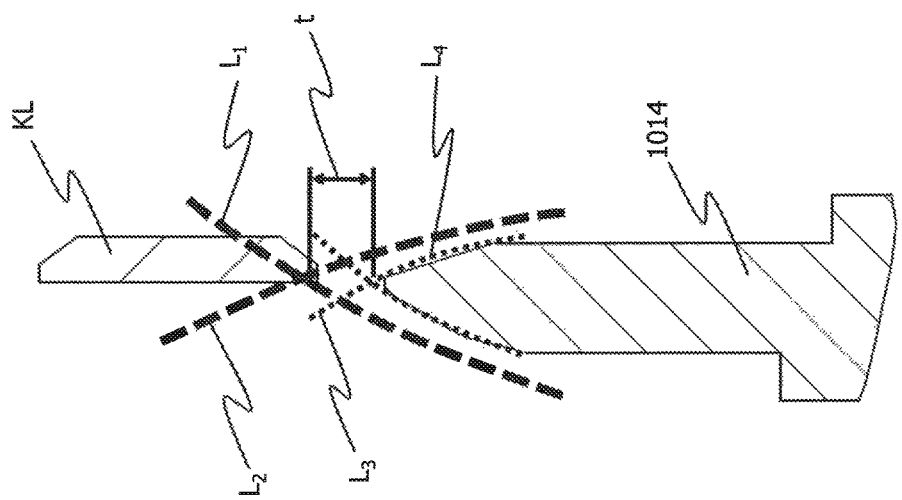
FIG. 28 shows an illustration for determining the maximum tooth height in the case of the teeth of the second group of teeth.
Figure 27:
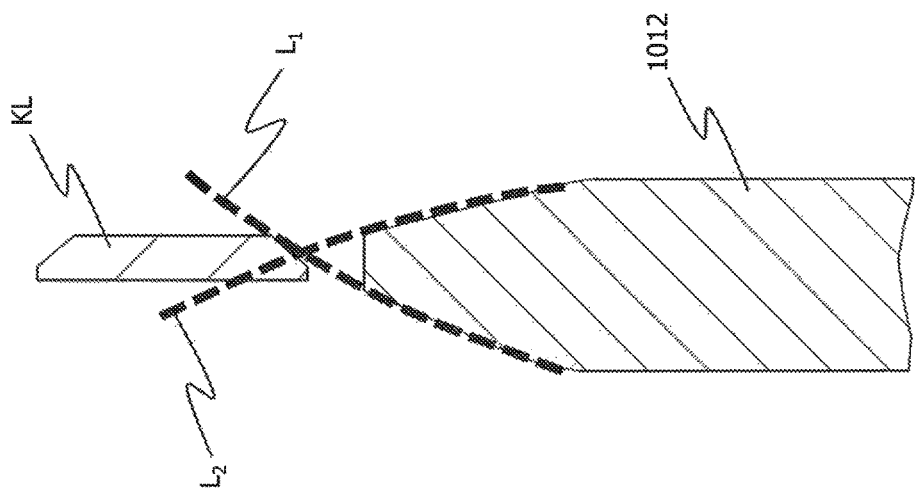
FIG. 27 shows an illustration for determining the maximum tooth height in the case of the teeth of the first group of teeth.

FIGS. 27 and 28 show schematically, for this exemplary embodiment, a way of determining the optimum tooth height and geometry in the region of the tooth crest, wherein FIG. 27 shows the case of the teeth 1012 of the first group of teeth and FIG. 28 shows the case of the teeth 1014 of the second group of teeth. The dashed lines in FIG. 27 show the highest possible tooth geometry in accordance with the profile of the link plates KL during operation. The intersecting point of the two dashed lines L1 and L2 in FIG. 27 refers as it were to the highest possible point of a tooth crest of a tooth 1012 of the first group of teeth in order to ensure reliable engagement of the tooth in a chain gap even in the event of a sharp chain offset, as may occur during the operation of a bicycle. It should be remembered that the chain offset results from an inclination of the chain which arises by the fact that the chain can be placed onto different sprockets of a set of sprockets on the rear wheel. The geometry of the tooth crest and the height thereof are formed in accordance with the dashed lines L1 and L2 in FIG. 27.

FIG. 28 shows the same situation for a tooth 1014 of the second group of teeth. The dashed lines L1 and L2 in turn show the situation for the adjacent tooth 1012 of the first group of teeth, and the dotted lines L3 and L4 show the situation for the tooth 1014 of the second group of teeth. This results in the minimum height difference t between the teeth 1012 and 1014 in order to optimize the tooth arrangement in respect of the offset situation of the chain.

Figure 30:
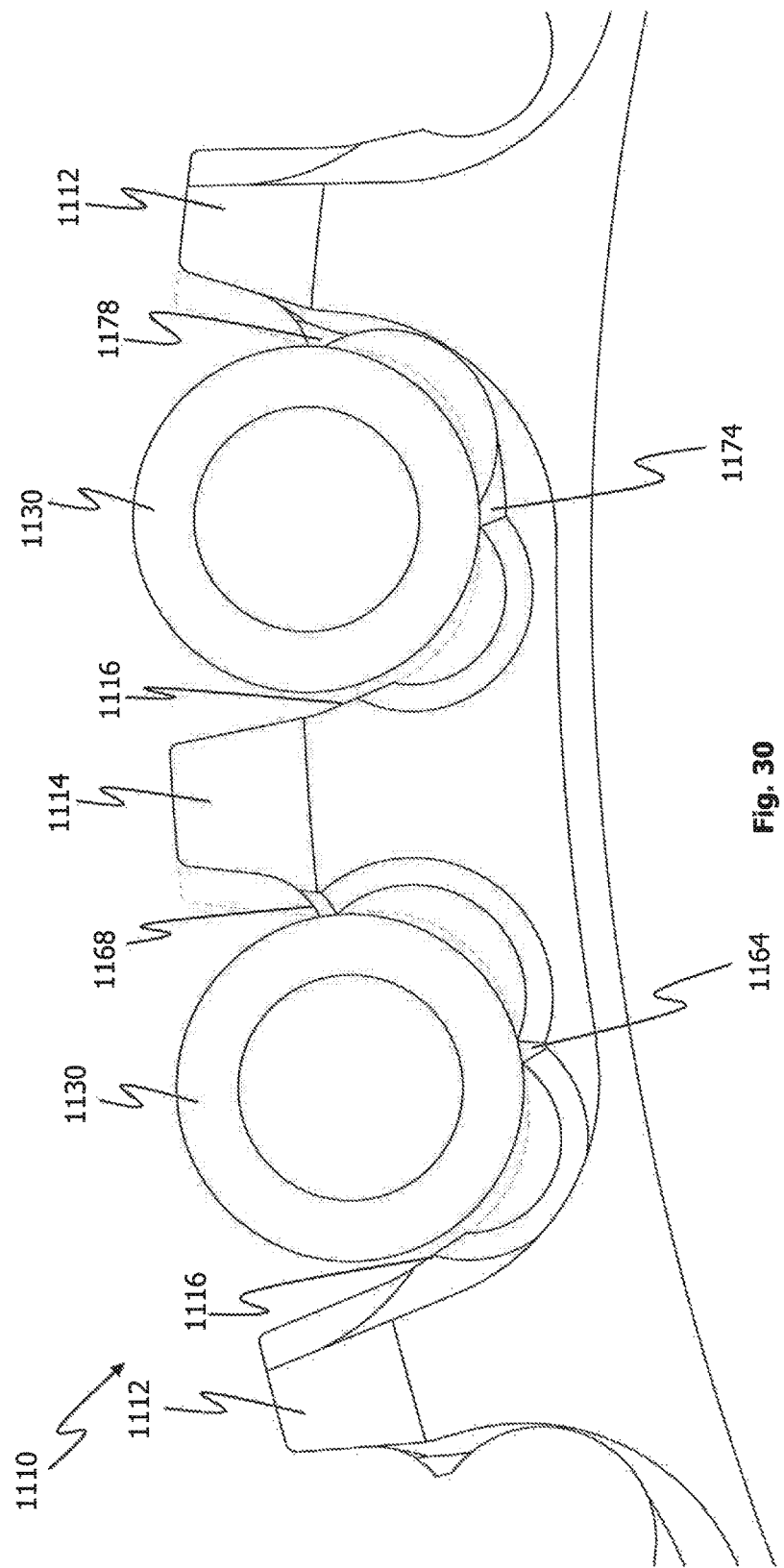
FIG. 30 shows the chain wheel according to FIG. 29 in a first operating phase during entry of the chain.
Figure 31:
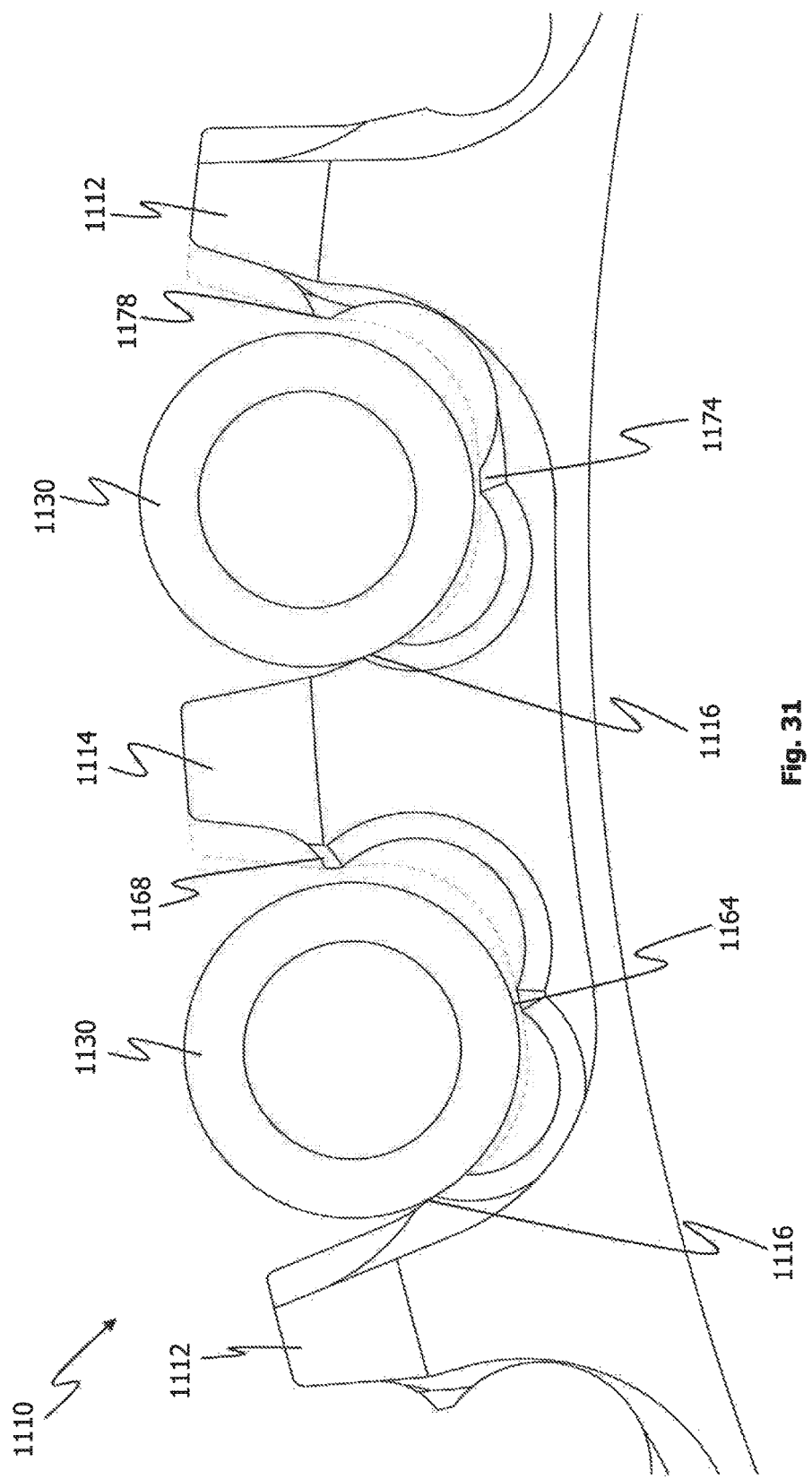
FIG. 31 shows the chain wheel according to FIG. 29 in a following operating phase of transmission of force by the chain.

FIGS. 29-31 show a further embodiment of an individual chain wheel 1110. Said individual chain wheel also has teeth 1112 of the first group of teeth and teeth 1114 of the second group of teeth. The tooth flanks of the teeth 1112 of the first group of teeth of the embodiment according to FIG. 14 are formed with the following substantial differences:

Starting from the left tooth 1112 shown in FIG. 29, two bevelled incisions 1160, 1162, which are designed in the shape of an arc of a circle, are provided in the region of the tooth base. The radius of said arcs of a circle is selected to be significantly smaller than the radius of an engaging roller. This results in a geometry with a load flank portion 1116 which is adjoined, in the region of the tooth base or tooth gap, by the two recesses 1160, 1162 which enclose a contact portion 1164 therebetween. The tooth crest of the central tooth 1114, which follows the first tooth in FIG. 29, of the second group of teeth also has a recessed region 1166, thus producing a further contact portion 1168 together with the recess 1162. Starting from the tooth 1114, again two bevelled recesses 1170 and 1172 which are in the shape of an arc of a circle are then provided in the following tooth gap, said recesses forming a contact portion 1174 therebetween. The tooth 1112 also has, in the tooth crest thereof, an additional recess 1176 which, together with the recess 1172, leads to a further contact portion 1178. This arrangement continues along the outer circumference of the individual chain wheel 1110.

This embodiment shows the above-described advantages in respect of little susceptibility to wear because of the special configuration of the load flank 1116, wherein the individual contact points 1164, 1168, 1174, 1178 additionally ensure that, because of the local loads occurring there, any soiling in the region of the individual chain wheel 1110 can be penetrated and displaced, and it can thus be ensured that the chain is brought up to the load flank in the desired manner. This is shown in FIGS. 30 and 31, wherein, in the state according to FIG. 30, the roller 1130 engages precisely in the tooth gaps and load is not yet transmitted, and wherein the state according to FIG. 31 illustrates a state in which load is just being transmitted from the rollers 1130 to the teeth.

Figure 32:
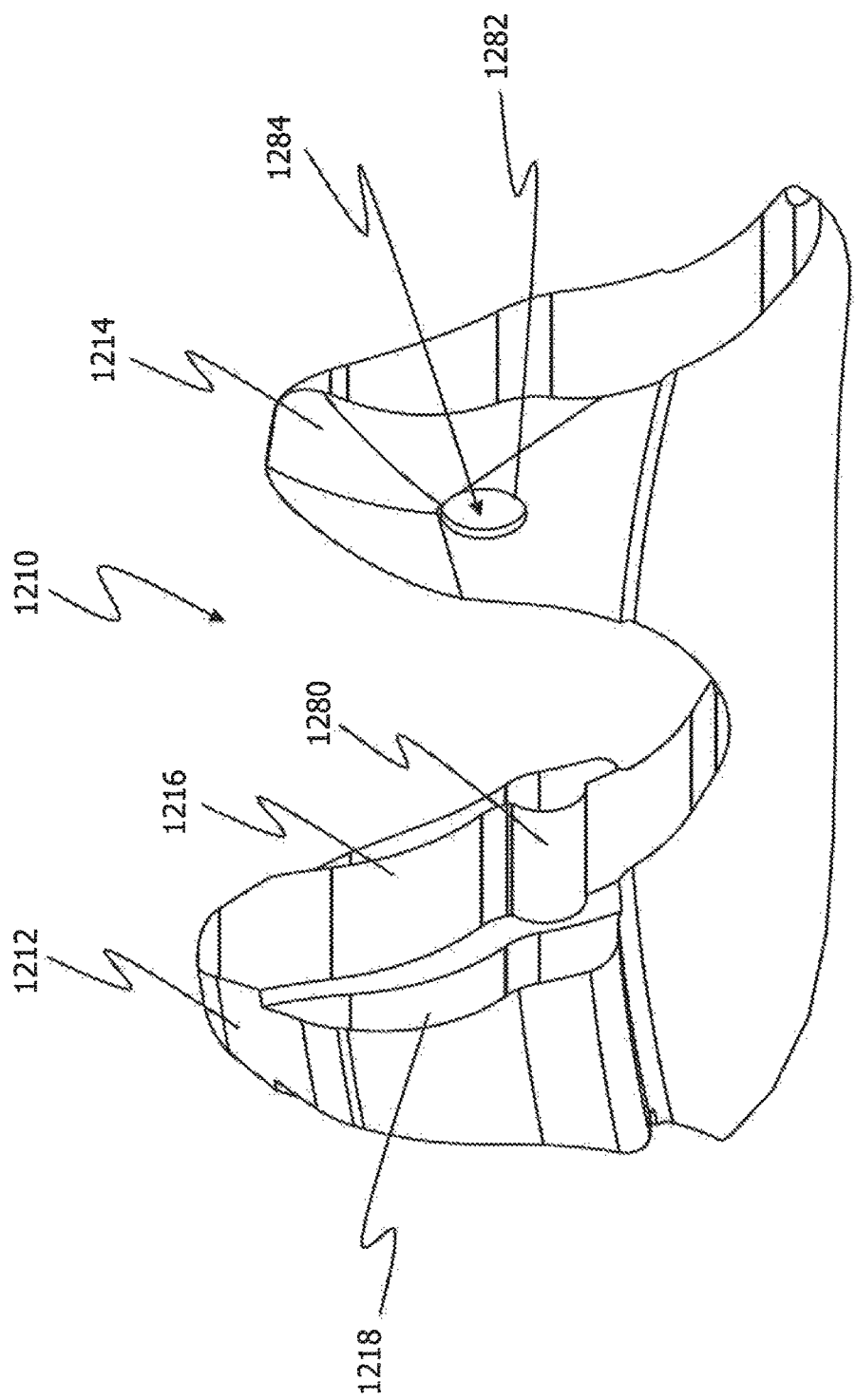
FIG. 32 shows a perspective view of a further embodiment, wherein only two teeth each having a depression as wear indicator are depicted.
Figure 33:
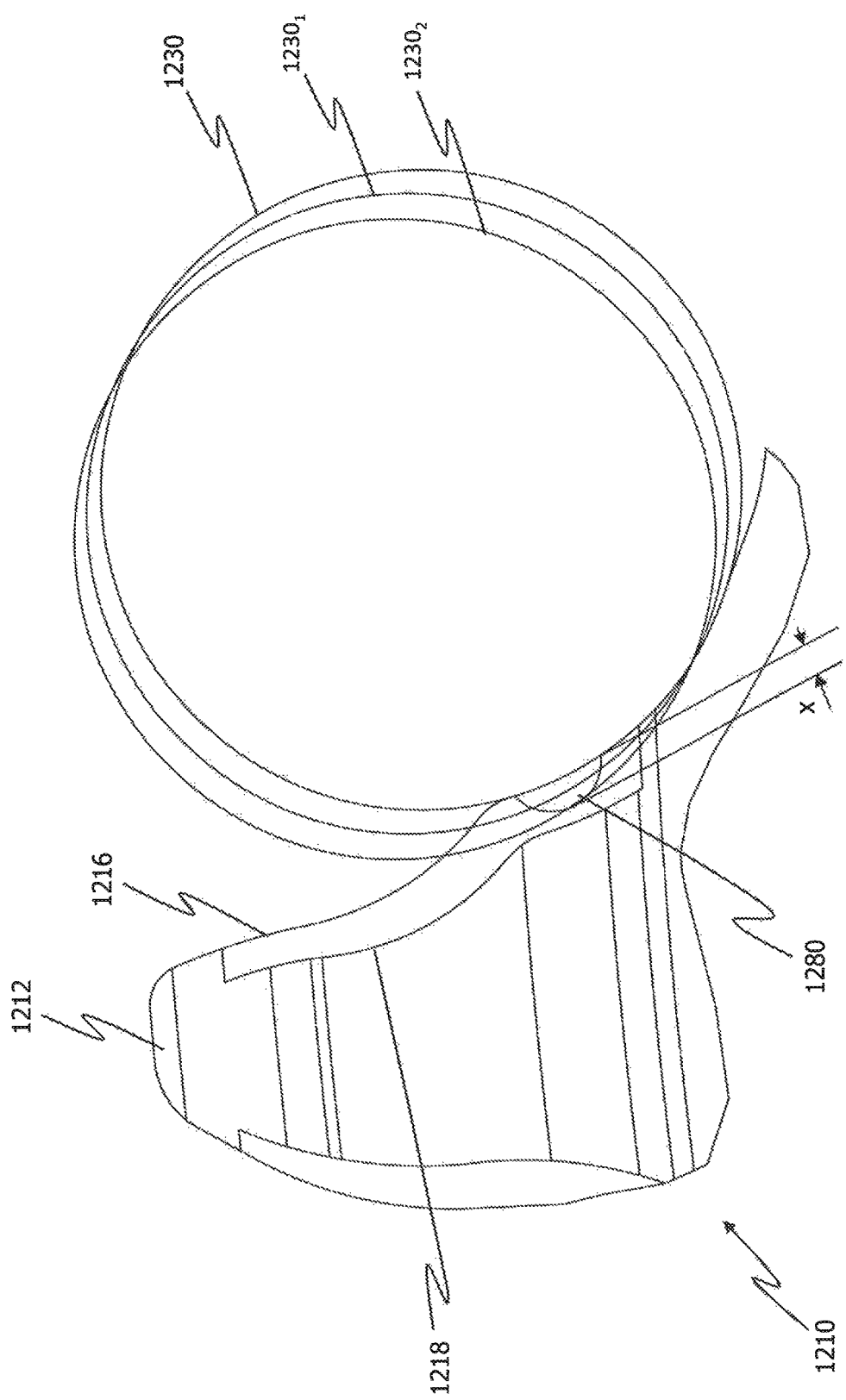
FIG. 33 shows a schematic illustration which shows the manner of operation of the wear indicator attached to a load flank.
Figure 34:
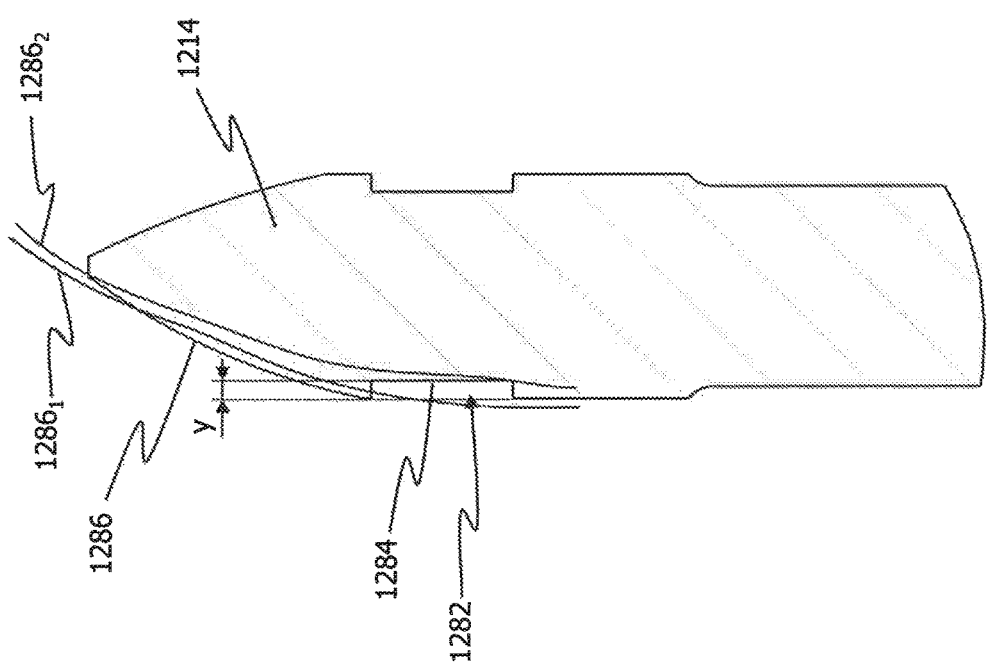
FIG. 34 shows a schematic illustration which shows the manner of operation of the wear indicator attached to a side surface of a tooth.
Figure 35:
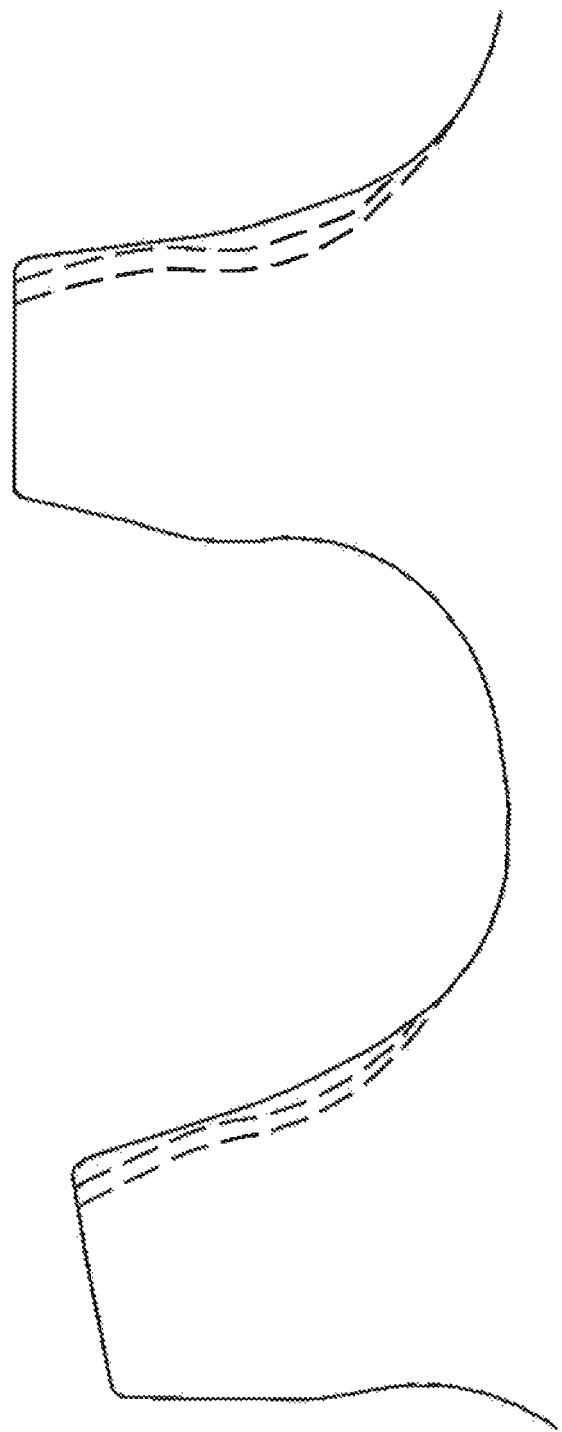
FIG. 35 illustrates various wear situations in the case of a chain wheel according to the prior art.

FIGS. 32-34 show a further exemplary embodiment that can be combined as desired with the preceding exemplary embodiments. In this exemplary embodiment, an individual chain wheel 1210 is formed with wear indicators. FIG. 32 shows, in a perspective illustration, just two teeth of said individual chain wheel 1210, namely a tooth 1212, which is of greater material thickness, of the first group of teeth and a narrower tooth 1214 of the second group of teeth. The design of the load flank 1216 and of the opening 1218 correspond to the above described features.

However, this embodiment differs from the above described features in that a recess 1280 is provided in the load flank 1216. Said recess 1280 can have any contour and depth. In the case of the example shown, said recess is formed, in side view, with a circular contour, the radius of which is considerably smaller than the radius of a roller adjacent to the load flank. For example, the radius of the recess 1280 can be $^1\!/_{10}$ of the radius of the roller. The recess 1280 is arranged in a region of the load flank 1216, in which the roller acts in a force transmitting and therefore wearing manner during operation. This can be seen in FIG. 33 in which the tooth 1212 is shown in side view, and a roller 1230 is illustrated in various wear dependent positions by means of a circle. Finally, it is seen that the recess 1280 extends over the entire tooth depth (material thickness). This is one variant. However, it is alternatively also possible for the recess 1280 to only extend partially along the tooth over a portion of the tooth depth (material thickness), for example only along one third or half of the tooth.

As wear increases on the load flank 1216, the roller 1230 digs ever further into the load flank 1216 via a partially worn-out position 12301 until, finally, the maximum worn out position 12302 is reached, and therefore the roller bears against the lowest point of the recess 1280. In said maximum worn out state, the surrounding material regions of the load flank 1216 are completely eroded. The maximum wear, which is indicated by the dimension x in FIG. 33, has been reached. The user of the chain wheel 1210 therefore recognizes the current wearing state of the chain wheel 1210 with reference to the respective continued existence of the recess 1280 and the remaining available depth.

The readability of a wear indicator formed by the recess 1280 can be improved by the fact that the material regions surrounding the recess 1280, in the side view according to FIG. 33, are identified by special high contrast colouring or the surface of the recess 1082 itself is identified by high contrast, for example by anodizing or by other permanent surface treatments.

FIG. 34 shows a sectional view through the tooth 1214 of the second group of teeth. As seen in FIGS. 32 and 34, said tooth has, on the side surface thereof, a circular depression 1282 in a region in which the link plates act in a rubbing manner during operation. This depression also serves as a wear indicator, wherein the basic surface 1284 thereof is particularly identified by special high-contrast colouring, for example by anodizing or by other permanent surface treatments.

The operating principle is the same as described above for the recess 1280. As wear increases, the contour 1286 of the tooth 1214 changes from the initial state via a partially worn-out state, which is identified by the contour line 12861, to a completely worn-out state which is identified by the contour line 12862. If said completely worn-out state is reached, the material of the tooth 1214, which material surrounds the depression 1282, has been eroded as far as the base 1284 of the depression 1282. The maximum weary has then been reached. This is also an identifiable indicator of the tooth wear.

It goes without saying that the two wear indicators 1280 and 1282 can be used together or else separately on individual chain wheels 1210 or chain wheels of a different type. The two wear indicators, the recess 1280, on the one hand, and the recess 1282, on the other hand, make it possible to indicate the current wear of the individual chain wheel 1210 to a user and to identify the reaching of a maximum wearing state, at which the user can then replace the individual chain wheel by a new individual chain wheel or—in the case of a substantially symmetrical design of the tooth—can continue to use the individual chain wheel by mirror-inverted repositioning, as described above.

The embodiments described herein show diverse possibilities of countering the problem of wear on individual chain wheels. As set forth in the attached set of claims, these possibilities can be advantageously combined with one another. The present description of individual exemplary embodiments is therefore not definitive, but rather merely shows how these embodiment features can be combined with one another. It is thus possible, for example, also to provide the recesses described in the exemplary embodiment according to FIGS. 29-31 in other exemplary embodiments.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An individual chain wheel for a bicycle front crank arrangement for engaging in a drive chain, said individual chain wheel comprising:
a plurality of teeth formed on a circumference of the chain wheel and having a first and a second group of teeth, wherein the teeth of the second group of teeth are arranged in an alternating manner between the teeth of the first group of teeth,
wherein each tooth has a load flank via which force is transmitted between an adjacent roller of the drive chain and a respective tooth of the plurality of teeth, wherein each tooth of the first group has at least one profile with an opening in a vicinity of the flank, the opening having an opening flank protruding from a side of the first set of teeth, and
wherein the load flank of the first set of teeth has a recess which is arranged radially outside and away from a contact point of a roller with the load flank during operation.

2. The individual chain wheel according to claim 1, wherein the load flank of the at least one tooth of the first group of teeth has a load flank angle within a region of 110° and 125°.

3. The individual chain wheel according to claim 2, wherein the load flank of the at least one tooth of the first group of teeth has a load flank angle within a region of 115°.

4. The individual chain wheel according to claim 1, wherein at least one projection which engages, at least in sections, over the adjacent roller or the inner link plate is formed at least on every second tooth.

5. The individual chain wheel according to claim 4, wherein the at least one projection is provided on a region of the respective tooth, which region lies radially on the outside with respect to a central axis of the individual chain wheel.

6. The individual chain wheel according to claim 5, wherein the at least one projection connects the load flank and a radially outwardly facing upper side of the respective tooth.

7. The individual chain wheel according to claim 4, wherein the at least one projection forms a hook projecting in a circumferential direction from the load flank.

8. The individual chain wheel according to claim 4, wherein the at least one projection has, as viewed transversely with respect to a circumferential direction of the individual chain wheel, a smaller width than the load flank or is formed with a decreasing material thickness, as viewed in the circumferential direction.

9. The individual chain wheel according to claim 4, wherein the at least one projection is provided in the at least one opening in the vicinity of the flank.

10. The individual chain wheel according to claim 9, wherein the at least one projection is provided at one end of the at least one opening in the vicinity of the flank, wherein the at least one projection by means of a radially outer edge is adjacent to a region of the load flank.

11. The individual chain wheel according to claim 1, wherein the first set of teeth include lateral flank edges of the load flank, and the opening flank is set back in the circumferential direction from the lateral flank edges.

12. The individual chain wheel according to claim 1, wherein the recess has a curved contour.

13. The individual chain wheel according to claim 1, wherein the recess extends over an entire width of the load flank.

14. The individual chain wheel according to claim 1, wherein the load flank has a first recess free load flank portion which is adjacent to the recess radially inward with respect to a central axis of the chain wheel.

15. The individual chain wheel according to claim 14, wherein the recess connects the first recess free load flank portion and a radially outer crest region or a radially outer side surface of the respective tooth, which side surface faces in a circumferential direction, wherein the recess by means of an end region, which lies radially on the inside with respect to the central axis of the chain wheel, is adjacent to the recess free load flank portion and by means of an end region, which lies radially on the outside with respect to the central axis of the chain wheel, is adjacent to the crest region or to the side surface which lies radially on the outside and faces in the circumferential direction.

16. The individual chain wheel according to claim 14, wherein the load flank has a second recess free load flank portion which is adjacent to the recess radially outward with respect to the central axis of the chain wheel.

17. The individual chain wheel according to claim 16, wherein the first and/or the second recess free load flank portion has a load flank angle within a region of 110° and 125°.

18. The individual chain wheel according to claim 17, wherein the first and/or the second recess free load flank portion has a load flank angle within a region of 115°.

19. The individual chain wheel according to claim 1, wherein each tooth has a counterload flank which is arranged opposite the load flank and is spaced apart therefrom, wherein the counterload flank is formed substantially symmetrically with respect to the load flank.

20. The individual chain wheel according to claim 1, wherein, in a region of the profile, the opening in the vicinity of the flank is set back only in sections in relation to the load flank by a greater distance than the distance over which a portion of an inner link plate of the drive chain, which portion runs ahead during operation, protrudes over the roller.

21. The individual chain wheel according to claim 20, wherein the opening in the vicinity of the flank has, in a region of a tooth crest, a projection pointing toward the load flank.

22. The individual chain wheel according to claim 1, wherein the teeth of the second group of teeth in a radial direction of the individual chain wheel are formed with a lower height than the teeth of the first group of teeth.

23. The individual chain wheel according to claim 22, wherein the teeth of the second group of teeth have a height of at maximum 90% of the height of the teeth of the first group of teeth.

24. The individual chain wheel according to claim 1, wherein, between teeth of the first group of teeth and teeth of the second group of teeth on a rear side of a tooth of the second group of teeth, which rear side is opposite the load flank, or in a tooth gap adjacent to the load flank, the individual chain wheel has an outer contouring leading to local contact points or contact portions with a roller.

25. The individual chain wheel according to claim 24, wherein the outer contouring is provided by adding at least one recess shaped as an arc of a circle, wherein a radius of the arc of the circle is smaller than the radius of the roller.

26. The individual chain wheel according to claim 1, wherein at least one tooth of the first group of teeth and/or at least one tooth of the second group of teeth has at least one wear indicator in the form of a depression.

27. The individual chain wheel according to claim 26, wherein the at least one wear indicator is formed in a region of the load flank of the respective tooth.

28. The individual chain wheel according to claim 26, wherein the at least one wear indicator is formed in a region of a side surface of the respective tooth.

29. A front crank arrangement for a bicycle, the front crank arrangement comprising:
 a crank arm; and
 an individual chain wheel attached to the crank arm, wherein the individual chain wheel is configured for engaging in a drive chain of the bicycle, said individual chain wheel comprising:
  a plurality of teeth formed on a circumference of the chain wheel and having a first and a second group of teeth, wherein the teeth of the second group of teeth are arranged in an alternating manner between the teeth of the first group of teeth,
  wherein each tooth has a load flank via which force is transmitted between an adjacent roller of the drive chain and a respective tooth of the plurality of teeth,
  wherein each tooth of the first group has at least one profile with an opening in a vicinity of the flank, the opening having an opening flank protruding from a side of the first set of teeth, and
  wherein the load flank of the first set of teeth has a recess which is arranged radially outside and away from a contact point of a roller with the load flank during operation.

* * * * *